(12) United States Patent
Song et al.

(10) Patent No.: US 12,217,707 B2
(45) Date of Patent: Feb. 4, 2025

(54) DISPLAY DEVICE

(71) Applicant: SAMSUNG DISPLAY CO., LTD., Yongin-si (KR)

(72) Inventors: Bo Kwang Song, Yongin-si (KR); Tae Kyung Ahn, Yongin-si (KR); Gun Hee Kim, Yongin-si (KR); Dae Young Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/176,702

(22) Filed: Mar. 1, 2023

(65) Prior Publication Data
US 2023/0377524 A1 Nov. 23, 2023

(30) Foreign Application Priority Data
May 17, 2022 (KR) .................. 10-2022-0060233

(51) Int. Cl.
*G09G 3/3291* (2016.01)
*G06V 40/13* (2022.01)

(52) U.S. Cl.
CPC ....... *G09G 3/3291* (2013.01); *G06V 40/1318* (2022.01); *G09G 2310/08* (2013.01); *G09G 2360/14* (2013.01)

(58) Field of Classification Search
CPC ............. G09G 3/3291; G09G 2310/08; G09G 2360/14; G06V 40/1318
See application file for complete search history.

(56) References Cited

U.S. PATENT DOCUMENTS

| 2020/0279086 A1* | 9/2020 | Wang ................. G02F 1/13338 |
| 2021/0200976 A1* | 7/2021 | Chang ................. H04N 13/312 |
| 2021/0408140 A1* | 12/2021 | Han ..................... H10K 59/65 |

FOREIGN PATENT DOCUMENTS

| KR | 10-1957913 | 3/2019 |
| KR | 10-20200076035 | 6/2020 |
| KR | 10-2295068 | 8/2021 |
| WO | 2020165686 | 8/2020 |

* cited by examiner

*Primary Examiner* — Lixi C Simpson
(74) *Attorney, Agent, or Firm* — F. Chau & Associates, LLC

(57) ABSTRACT

A display device includes light emitting pixels that emit light, photosensors each controlling a sensed current according to an incident light, and a read-out circuit that senses the sensed current of each of the photosensors and converts the sensed current into digital sensed data. In a sensing mode including a first frame period and a second frame period, the light emitting pixels include first sensing pixels that emit the light during the first frame period and second sensing pixels that do not emit the light during the first frame period, the photosensors include first photosensors and second photosensors, and a first distance between any one of the first sensing pixels and a first photosensor adjacent to the first sensing pixel among the first photosensors is greater than a second distance between the first sensing pixel and a second photosensor adjacent to the first sensing pixel among the second photosensors.

20 Claims, 19 Drawing Sheets

DISPLAY DEVICE

CROSS-REFERENCE TO RELATED APPLICATIONS

This application claims priority under 35 U.S.C. 119 to Korean Patent Application No. 10-2022-0060233, filed on May 17, 2022 in the Korean Intellectual Property Office, the disclosure of which is incorporated by reference herein in its entirety.

TECHNICAL FIELD

Embodiments of the present disclosure relate to a display device and a method of manufacturing the same.

DISCUSSION OF RELATED ART

Display devices are utilized in various electronic devices such as smartphones, tablet personal computers (PCs), laptop computers, monitors, and televisions (TVs). Recently, due to the development of mobile communication technology, the use of portable electronic devices such as smartphones, tablet PCs, and laptop computers has significantly increased. Since privacy information is stored in portable electronic devices, fingerprint authentication for authenticating a user's fingerprint, which is biometric information of a user, has been used to protect the privacy information of the portable electronic device.

For example, the display device may authenticate the user's fingerprint using an optical method, an ultrasonic method, a capacitive method, or the like. The optical method may authenticate the user's fingerprint by sensing light reflected from the user's fingerprint. The display device may include a display panel including pixels for displaying an image and photosensors for sensing light to authenticate the user's fingerprint by the optical method.

SUMMARY

Aspects of the present disclosure provide a display device capable of accurately sensing light by driving photosensors that are not adjacent to pixels emitting light to decrease a leakage current.

However, aspects of the present disclosure are not restricted to those set forth herein.

According to an embodiment of the present disclosure, a display device includes a plurality of light emitting pixels that emit light, a plurality of photosensors, each controlling a sensed current according to an incident light, and a read-out circuit that senses the sensed current of each of the photosensors and converts the sensed current into digital sensed data. In a sensing mode including a first frame period and a second frame period, the light emitting pixels include first sensing pixels that emit light during the first frame period and second sensing pixels that do not emit light during the first frame period, the photosensors include first photosensors and second photosensors, and a first distance between any one of the first sensing pixels and a first photosensor adjacent to the first sensing pixel among the first photosensors is greater than a second distance between the first sensing pixel and a second photosensor adjacent to the first sensing pixel among the second photosensors.

The display device may further include a controller that excludes digital sensed data obtained by the second photosensors and reads a fingerprint image according to digital sensed data obtained by the first photosensors, in the first frame period.

During the second frame period, the second sensing pixels may emit the light, and the first sensing pixels do not emit the light, and the first frame period may be an odd frame period, and the second frame period is an even frame period.

In the first frame period, a third distance between any one of the second sensing pixels and a second photosensor adjacent to the second sensing pixel among the second photosensors may be greater than a fourth distance between the second sensing pixel and a first photosensor adjacent to the second sensing pixel among the first photosensors.

The third distance may be greater than the second distance, and the first distance may be greater than the fourth distance.

The first distance may be the same as the third distance, and the second distance may be the same as the fourth distance.

In the first frame period, a third distance between any one of the first sensing pixels and a second sensing pixel adjacent to the first sensing pixel among the second sensing pixels may be the same as a distance between the first sensing pixel and a first sensing pixel adjacent to the first sensing pixel among the first sensing pixels.

The third distance may be the same as a distance between the second sensing pixel and a second sensing pixel adjacent to the second sensing pixel among the second sensing pixels.

The third distance may be smaller than the first distance and greater than the second distance.

In the first frame period, a fourth distance between any one of the first photosensors and a second photosensor adjacent to the first photosensor among the second photosensors may be the same as a distance between the first photosensor and a first photosensor adjacent to the first photosensor among the first photosensors.

The fourth distance may be smaller than a distance between the second photosensor and a second photosensor adjacent to the second photosensor among the second photosensors.

The fourth distance may be greater than the second distance and smaller than the first distance.

The light emitting pixels may emit green light.

In the first frame period, any one of the second photosensors may be disposed between any one of the first sensing pixels and another first sensing pixel adjacent to the first sensing pixel.

In the first frame period, any one of the second sensing pixels may be disposed between any one of the first photosensors and another first photosensor adjacent to the first photosensor.

According to an embodiment of the disclosure, a display device includes a plurality of light emitting pixels that emit light, and a plurality of photosensors, each controlling a sensed current according to an incident light. The light emitting pixels and the photosensors are alternately disposed in a first direction and a second direction orthogonal to the first direction. In a sensing mode including a first frame period and a second frame period, the light emitting pixels include first sensing pixels that emit the light during the first frame period and second sensing pixels that do not emit the light during the first frame period, and the photosensors include first photosensors and second photosensors.

The first photosensor and the second photosensor may neighbor each other in the second direction.

The first sensing pixel and the second sensing pixel may neighbor each other in the second direction.

According to an embodiment of the disclosure, a display device includes a plurality of light emitting pixels that emit light, a plurality of photosensors each controlling a sensed current according to an incident light, a timing controller that provides first image data to a data driver during a first frame period and provides second image data to the data driver during a second frame period, in a sensing mode, and the data driver. The data driver converts the first image data or the second image data into data voltages and supplies the data voltages to the light emitting pixels. The light emitting pixels include first sensing pixels and second sensing pixels, each of the first sensing pixels receives a first data voltage for emitting light and each of the second sensing pixels receives a second data voltage for not emitting light, based on the first image data during the first frame period in the sensing mode, and each of the second sensing pixels receives the first data voltage and each of the first sensing pixels receives the second data voltage, based on the second image data during the second frame period in the sensing mode.

The display device may further include a read-out circuit that senses the sensed current of each of the photosensors and converts the sensed current into digital sensed data. The photosensors include first photosensors and second photosensors. The display device may further include a processor that excludes digital sensed data obtained by the second photosensors and reads a fingerprint image according to digital sensed data obtained by the first photosensors, in the first frame period and that excludes digital sensed data obtained by the first photosensors and reads the fingerprint image according to the digital sensed data obtained by the second photosensors, during the second frame period.

With a display device according to embodiments, by driving photosensors that are not adjacent to pixels emitting light to decrease a leakage current, light may be accurately sensed and a user's fingerprint may be accurately measured.

The effects of the disclosure are not limited to the aforementioned effects.

BRIEF DESCRIPTION OF THE DRAWINGS

The above and other aspects and features of the present disclosure will become more apparent by describing in detail embodiments thereof with reference to the accompanying drawings, in which.

DETAILED DESCRIPTION OF THE EMBODIMENTS

Figure 1:
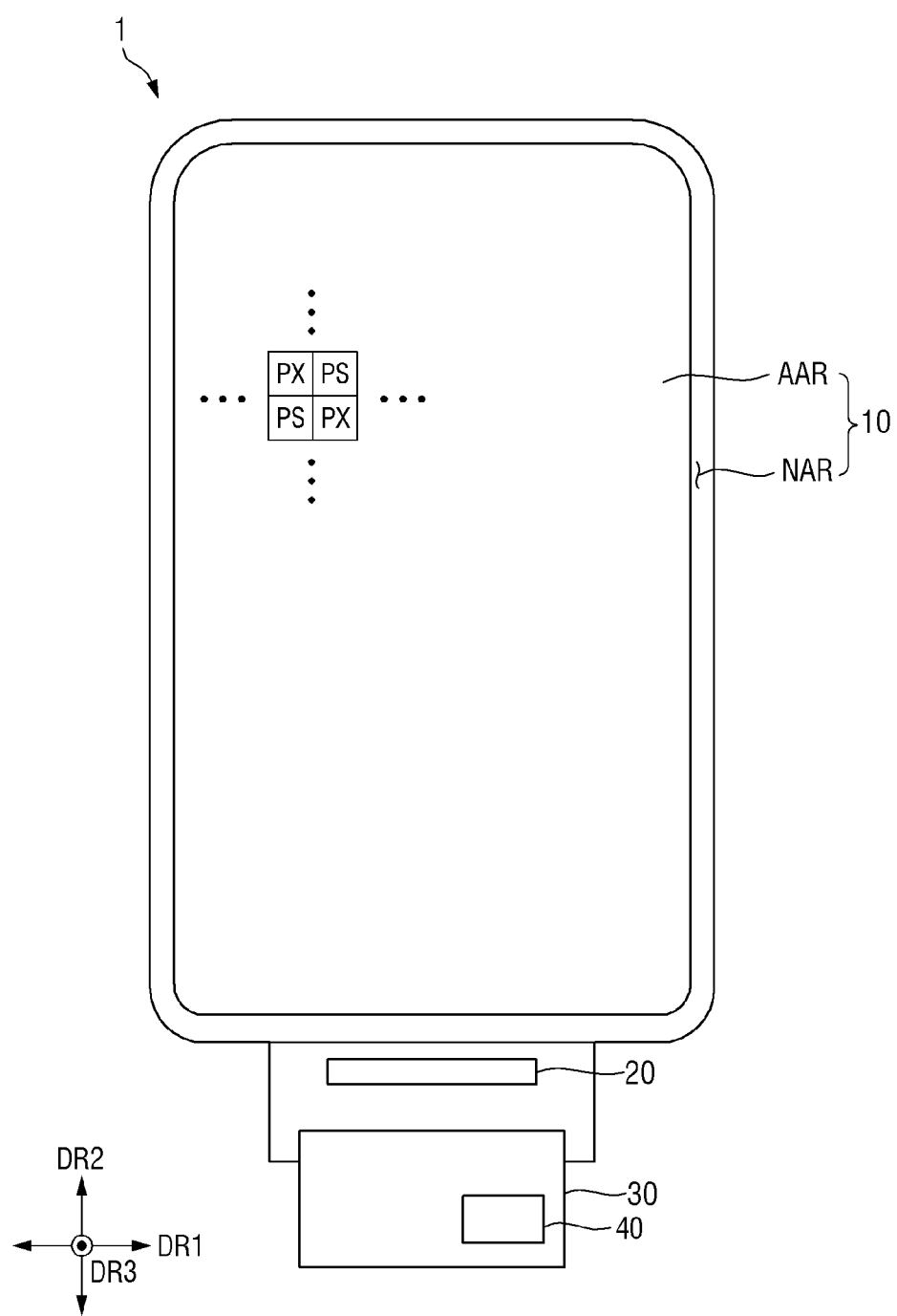
FIG. 1 is a plan view illustrating a display device according to an embodiment.

Embodiments of the present disclosure will be described more fully hereinafter with reference to the accompanying drawings. Like reference numerals may refer to like elements throughout the accompanying drawings.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

It will be further understood that when a component is referred to as being 'on', 'connected to', 'coupled to', or 'adjacent to' another component, it can be directly on, connected to, coupled to, or adjacent to the other component, or intervening components may also be present. It will also be understood that when a component is referred to as being 'between' two components, it can be the only component between the two components, or one or more intervening components may also be present.

As used herein, the term "about" is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

FIG. 1 is a plan view illustrating a display device according to an embodiment.

In FIG. 1, a first direction DR1, a second direction DR2, and a third direction DR3 are denoted. The first direction DR1 is a direction parallel to one side of a display device 1 in a plan view, and may be, for example, a transverse direction of the display device 1. The second direction DR2 is a direction parallel to the other side of the display device 1 in contact with one side of the display device 1 in a plan view, and may be a longitudinal direction of the display device 1. Hereinafter, for convenience of explanation, one side in the first direction DR1 refers to a right direction in a plan view, the other side in the first direction DR1 refers to a left direction in a plan view, one side in the second direction DR2 refers to an upper direction in a plan view, and the other side in the second direction DR2 refers to a lower direction in a plan view. The third direction DR3 may be a thickness direction of the display device 1.

However, it is to be understood that directions described with reference to embodiments refer to relative directions, and embodiments are not limited thereto.

Unless otherwise defined, the terms "above" and "upper surface" expressed with respect to the third direction DR3 as used herein refer to a display surface side with respect to a display panel 10, and the terms "below" and "lower surface", and "rear surface" expressed with respect to the third direction DR3 as used herein refer to a side opposite to a display surface with respect to the display panel 10.

Referring to FIG. 1, the display device 1 may include various electronic devices providing a display screen. Examples of the display device 1 may include, but are not limited to, mobile phones, smartphones, tablet personal computers (PCs), mobile communication terminals, electronic notebooks, electronic books, personal digital assistants (PDAs), portable multimedia players (PMPs), navigation devices, ultra mobile PCs (UMPCs), televisions, game machines, wrist watch-type electronic devices, head-mounted displays, monitors of personal computers, laptop computers, vehicle instrument boards, digital cameras, camcorders, external billboards, electric signs, various medical devices, various inspection devices, various home appliances including display areas, such as refrigerators and washing machines, Internet of Things (IoT) devices, or the like. Representative examples of a display device 1 to be described later may include smartphones, tablet PCs, laptop computers, or the like, but are not limited thereto.

The display device 1 may include a display panel 10, a panel driving circuit 20, a circuit board 30, and a read-out circuit 40.

The display device 1 includes the display panel 10 having an active area AAR and a non-active area NAR. The active area AAR includes a display area in which a screen is disposed and an image is displayed. The active area AAR may completely overlap the display area. A plurality of pixels PX displaying an image may be disposed in the display area. Each pixel PX may include a light emitting element 'EL' (see FIG. 4).

In addition, the active area AAR further includes a fingerprint sensing area. The fingerprint sensing area is an area in which light is responded to, and is an area configured to sense an amount, a wavelength, or the like, of incident light. The fingerprint sensing area may overlap the display area. As an example, the fingerprint sensing area may be disposed only in a limited area utilized for fingerprint recognition within the active area AAR. In this case, in an embodiment, the fingerprint sensing area may overlap a portion of the display area, but does not overlap another portion of the display area. As another example, the fingerprint sensing area may be defined as an area exactly the same as the active area AAR. In this case, the entire surface of the active area AAR may be utilized as an area for fingerprint sensing. A plurality of photosensors PS responding to light may be disposed in the fingerprint sensing area. Each photosensor PS may include a photoelectric conversion element PD (see FIG. 4) that senses incident light and converts the incident light into an electrical signal.

The non-active area NAR is disposed around the active area AAR. The non-active area NAR may be a bezel area. The non-active area NAR may surround all sides (four sides in FIG. 1) of the active area AAR, but is not limited thereto.

The panel driving circuit 20 may be disposed in the non-active area NAR. The panel driving circuit 20 may drive the plurality of pixels PX and/or the plurality of photosensors PS. The panel driving circuit 20 may output signals and voltages for driving the display panel 10. The panel driving circuit 20 may be formed as an integrated circuit (IC) and be mounted on the display panel 10. Signal lines for transferring signals between the panel driving circuit 20 and the active area AAR may be further disposed in the non-active area NAR. As another example, the panel driving circuit 20 may be mounted on the circuit board 30.

In addition, signal lines or the read-out circuit 40 for applying signals to the active area AAR may be disposed in the non-active area NAR. The read-out circuit 40 may be connected to the respective photosensors PS through the signal lines, and may receive currents flowing to the respective photosensors PS to sense a user's fingerprint input. The read-out circuit 40 may be formed as an integrated circuit (IC) and may be attached to a display circuit board in a chip on film (COF) manner, but is not limited thereto. For example, according to embodiments, the read-out circuit 40 may be attached onto the non-active area NAR of the display panel 10 in a chip on glass (COG) manner, a chip on plastic (COP) manner, or an ultrasonic bonding method.

The circuit board 30 may be attached to one end of the display panel 10 using an anisotropic conductive film (ACF). Lead lines of the circuit board 30 may be electrically connected to pad parts of the display panel 10. The circuit board 30 may be a flexible printed circuit board or a flexible film such as a chip on film.

Figure 2:
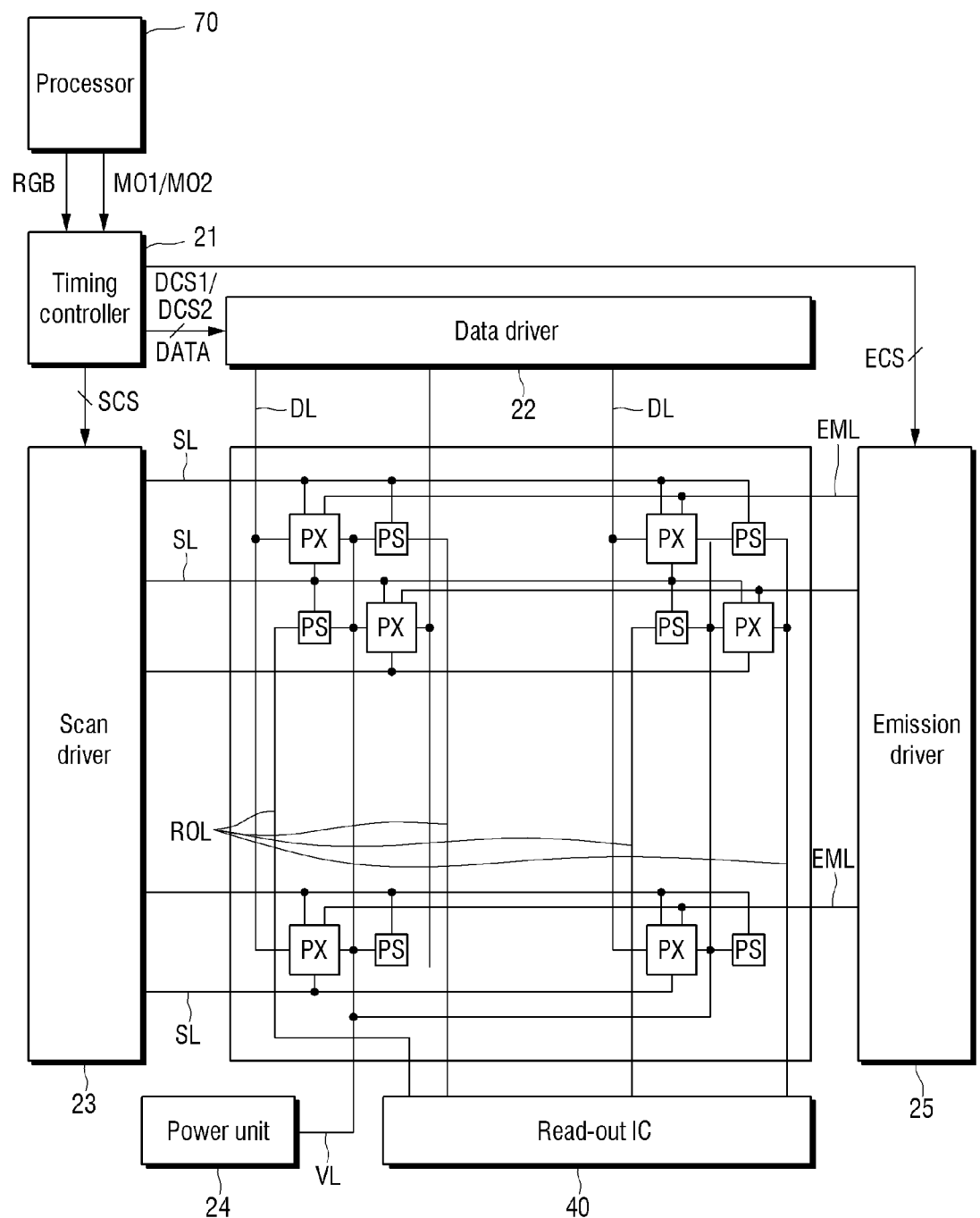
FIG. 2 is a block diagram of the display device according to an embodiment.

FIG. 2 is a block diagram of the display device 1 according to an embodiment.

Referring to FIG. 2, the display device 1 includes a processor 70, the panel driving circuit 20, and the read-out circuit 40.

The processor 70 supplies an image signal RGB supplied from outside of the display device 1 and a plurality of control signals to a timing controller 21. The processor 70 may further include a graphics processing unit (GPU) that provides graphics for the image signal RGB provided from outside of the display device 1. The image signal RGB is an image source on which graphics processing has been completed by the GPU, and may be provided to the timing controller 21. As an example, the image signal RGB may have a frequency of about 120 Hz. As another example, the image signal RGB may have a frequency of about 30 Hz.

The plurality of control signals supplied from the processor 70 include a first mode control signal MO1 and a second mode control signal MO2, a clock signal, an enable signal, and the like.

The first mode control signal MO1 may include a signal for displaying a general image. The second mode control signal MO2 may include a signal of a sensing mode for sensing a fingerprint F of a finger. The second mode control signal MO2 may include respective frame periods. For example, the second mode control signal MO2 may be a signal for controlling the display panel 10 so that the display panel 10 is driven during a first frame period and a second frame period. For example, the second mode control signal MO2 may be a signal for controlling some pixels PX to emit light and some other pixels PX not to emit light during the first frame period. In addition, the second mode control signal MO2 may be a signal for performing control to read the fingerprint F of the finger through digital sensed data sensed by some photosensors PS and exclude digital sensed data sensed by some other photosensors PS during the first frame period.

The processor 70 provides the first mode control signal MO1 to the timing controller 21 to display the image on the display panel 10. The processor 70 provides the second mode control signal MO2 to the timing controller 21 to sense a user's fingerprint. The timing controller 21 drives the pixels PX and the photosensors PS of the display panel 10 according to the second mode control signal MO2.

The panel driving circuit 20 includes a data driver 22 driving the pixels PX of the display panel 10, a scan driver 23 driving the pixels PX and the photosensors PS, and the timing controller 21 controlling driving timings of the data driver 22 and the scan driver 23. In addition, the panel driving circuit 20 may further include a power supply unit 24 and an emission driver 25.

The timing controller 21 receives the image signal supplied from the outside of the display device 1. The timing controller 21 may output image data DATA and a data control signal DCS (including DCS1 and DCS2) to the data driver 22. In addition, the timing controller 21 may generate a scan control signal SCS that controls an operation timing of the scan driver 23 and an emission control signal ECS that controls an operation timing of the emission driver 25. For example, the timing controller 21 may generate the scan control signal SCS and the emission control signal ECS, output the scan control signal SCS to the scan driver 23 through a scan control line, and output the emission control signal ECS to the emission driver 25 through an emission control line.

When the timing controller receives the first mode control signal MO1, the timing controller may generate a first data control signal DCS1. The timing controller may output the first data control signal DCS1 to the data driver 22. In addition, when the timing controller receives the second mode control signal MO2, the timing controller may generate a second data control signal DCS2. The timing controller may output the second data control signal DCS2 to the data driver 22. As described above, the second mode control signal MO2 may be a signal used to perform control to alternate the first frame period and the second frame period.

The data driver 22 may convert the image data DATA into analog data voltages and output the analog data voltages to data lines DL. The scan driver 23 may generate scan signals according to the scan control signal SCS, and sequentially output the scan signals to scan lines SL.

The power supply unit 24 may generate a driving voltage ELVDD (see FIG. 4) and supply the driving voltage ELVDD to a source voltage line VL, and may generate a common voltage ELVSS (see FIG. 4) and supply the common voltage ELVSS to the source voltage line VL. The source voltage line VL may include a driving voltage line and a common voltage line. The driving voltage ELVDD may be a high potential voltage for driving light emitting elements and photoelectric conversion elements, and the common voltage may be a low potential voltage for driving the light emitting elements and the photoelectric conversion elements. That is, the driving voltage may have a higher potential than the common voltage.

In addition, the emission driver 25 may generate emission control signals according to the emission control signal ECS and sequentially output the emission control signals to emission control lines EML. While it has been illustrated that the emission driver 25 exists separately from the scan driver 23, the disclosure is not limited thereto, and the emission driver may be included in the scan driver 23 according to embodiments.

The read-out circuit 40 may be connected to the respective photosensors PS through read-out lines ROL, and may receive currents flowing to the respective photosensors PS to sense a user's fingerprint input. The read-out circuit 40 may generate digital sensed data according to a magnitude of a current sensed by each photosensor PS and transmit the digital sensed data to the processor 70, and the processor 70 may determine whether a fingerprint coincides with a user's fingerprint through a comparison with a preset fingerprint by analyzing the digital sensed data. When the preset fingerprint and the digital sensed data transmitted from the read-out circuit 40 are the same as each other, set functions may be performed.

The display panel 10 further includes a plurality of pixels PX, a plurality of photosensors PS, a plurality of scan lines SL connected to the plurality of pixels PX and the plurality of photosensors PS, a plurality of data lines DL and a plurality of emission control lines EML connected to the plurality of pixels PX, and a plurality of read-out lines ROL connected to the plurality of photosensors PS.

Each of the plurality of pixels PX may be connected to at least one of the scan lines SL, any one of the data lines DL, at least one of the emission control lines EL, and the source voltage line VL.

Each of the plurality of photosensors PS may be connected to any one of the scan lines SL, any one of the read-out lines ROL, and the source voltage line VL.

The plurality of scan lines SL may connect the scan driver 23 to the plurality of pixels PX and the plurality of photosensors PS, respectively. The plurality of scan lines SL may provide the scan signals output from the scan driver 23 to the plurality of pixels PX and the plurality of photosensors PS, respectively.

The plurality of data lines DL may connect the data driver 22 to the plurality of pixels PX, respectively. The plurality of data lines DL may provide the image data output from the data driver 22 to the plurality of pixels PX, respectively.

The plurality of emission control lines EML may connect the emission driver 25 to the plurality of pixels PX, respectively. The plurality of emission control lines EML may provide the emission control signals output from the emission driver 25 to the plurality of pixels PX, respectively.

The plurality of read-out lines ROL may connect the plurality of photosensors PS to the read-out circuit 40, respectively. The plurality of read-out lines ROL may provide a sensed current generated according to a photocurrent output from each of the plurality of photosensors PS to the read-out circuit 40. Accordingly, the read-out circuit 40 may sense the user's fingerprint.

A plurality of source voltage lines VL may connect the power supply unit 24 to the plurality of pixels PX and the plurality of photosensors PS, respectively. The plurality of source voltage lines VL may provide the driving voltage ELVDD or the common voltage ELVSS from the power supply unit 24 to the plurality of pixels PX and the plurality of photosensors PS, respectively.

Figure 3:
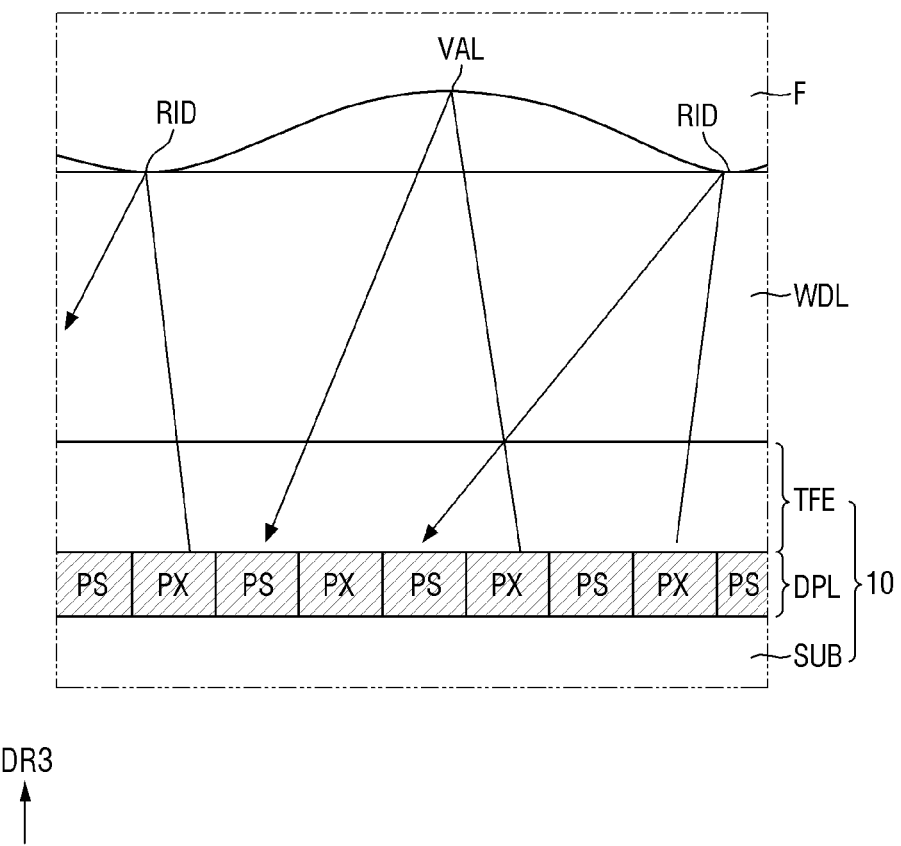
FIG. 3 is an illustrative view illustrating fingerprint sensing of the display device according to an embodiment.

FIG. 3 is an illustrative view illustrating fingerprint sensing of the display device according to an embodiment.

Referring to FIG. 3, the display device 1 may further include a window WDL disposed on the display panel 10. The display panel 10 may include a substrate SUB, a display layer DPL disposed on the substrate SUB and including the pixels PX and the photosensors PS, and an encapsulation layer TFE disposed on the display layer DPL.

When a user's finger comes into contact with an upper surface of the window WDL of the display device 1, light output from the pixels PX of the display panel 10 may be reflected from ridges RID of the fingerprint F of the user and valleys VAL between the ridges RID. In this case, a ridge RID portion of the fingerprint F is in contact with the upper surface of the window WDL, whereas a valley VAL portion of the fingerprint F is not in contact with the window WDL. That is, the upper surface of the window WDL is in contact with air in the valley VAL portion.

In this case, a refractive index of the fingerprint F and a refractive index of the air are different from each other, and thus, an amount of light reflected from the ridge RID of the fingerprint F and an amount of light reflected from the valley VAL of the fingerprint F may be different from each other. Accordingly, the ridge RID portion and the valley VAL portion of the fingerprint F may be derived based on a difference between amounts of the reflected light, that is, light incident on the photosensors PS. Since the photosensors PS output electrical signals (e.g., sensed currents) according to the difference between the amounts of light, a fingerprint F pattern of the finger may be identified.

However, when the photosensors PS adjacent to the plurality of pixels PX output the sensed currents, portions of emission currents for emitting light from the plurality of pixels PX may leak to the photosensors PS adjacent to the plurality of pixels. Accordingly, the sensed currents of the photosensors PS adjacent to the plurality of pixels may become different from each other, and the fingerprint F pattern of the finger may be incorrectly identified. This will be described below in further detail with reference to FIG. 4.

Figure 4:
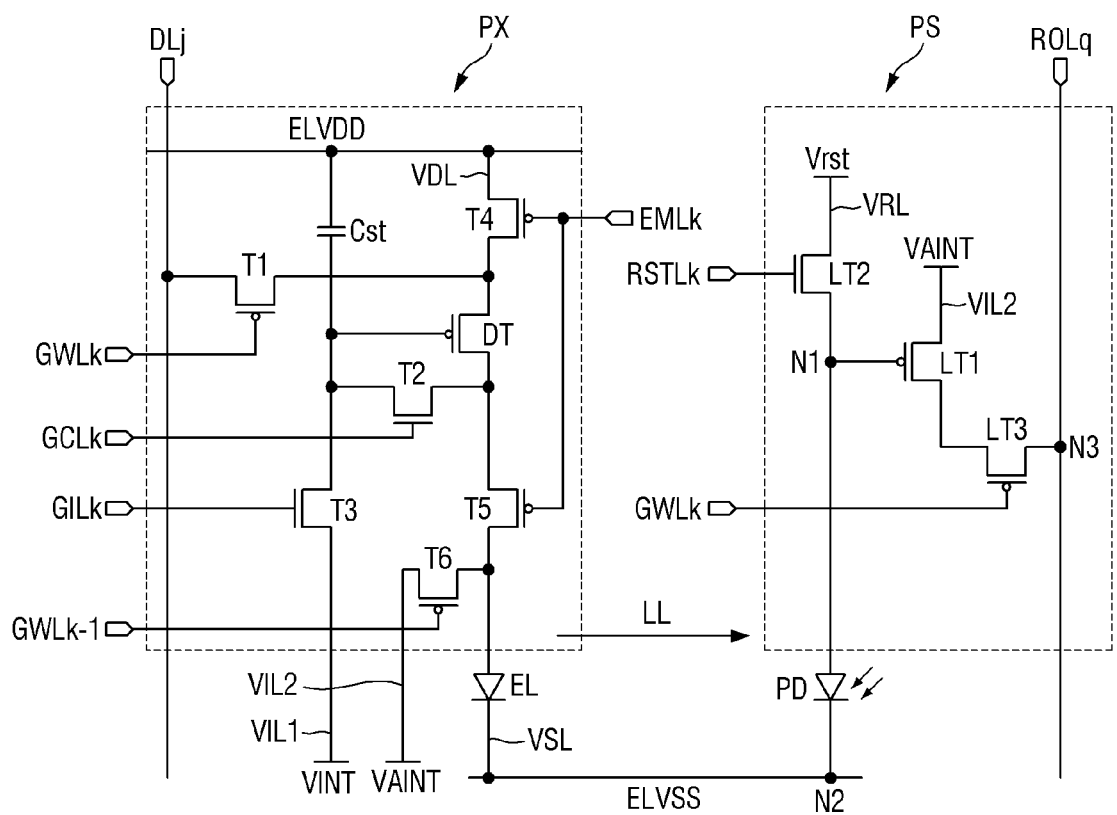
FIG. 4 is a circuit diagram illustrating a pixel and a photosensor according to an embodiment.

FIG. 4 is a circuit diagram illustrating a pixel and a photosensor according to an embodiment.

In FIG. 4, a circuit diagram of a pixel PX connected to a k-th scan initialization line GILk, a k-th scan line GWLk, a k-th scan control line GCLk, a k−1-th scan line GWLk−1, and a j-th data line DLj and a photosensor PS connected to the k-th scan line GWLk, a k-th reset control line RSTLk, and a q-th read-out line ROLq is illustrated, were k, j and q are positive integers.

The pixel PX may include a light emitting element EL, a plurality of switch elements, and a first capacitor Cst. The light emitting element EL includes light emitting parts PX1, PX2, PX3, and PX4 (see FIG. 5) emitting light. The switch elements include first to sixth transistors T1, T2, T3, T4, T5, and T6.

A driving transistor DT may include a gate electrode, a first electrode, and a second electrode. The driving transistor DT controls a drain-source current Isd (hereinafter, referred to as a "driving current") flowing between the first electrode and the second electrode according to a data voltage applied to the gate electrode. The driving current Isd flowing through a channel of the driving transistor DT is proportional to the square of a difference between a voltage Vgs between the first electrode and the gate electrode and a threshold voltage of the driving transistor DT as represented in Equation 1.

$$Isd = k' \times (Vsg - Vth)^2 \quad \text{[Equation 1]}$$

Here, Isd is the driving current and refers to a source-drain current flowing through the channel of the driving transistor DT, k' refers to a proportional coefficient determined by a structure and physical characteristics of the driving transistor, Vsg refers to the voltage between the first electrode and the gate electrode of the driving transistor, and Vth refers to the threshold voltage of the driving transistor.

The light emitting element EL emits light according to the driving current Isd. The larger the driving current Isd, the larger the amount of light emitted from the light emitting element EL.

Figure 16:
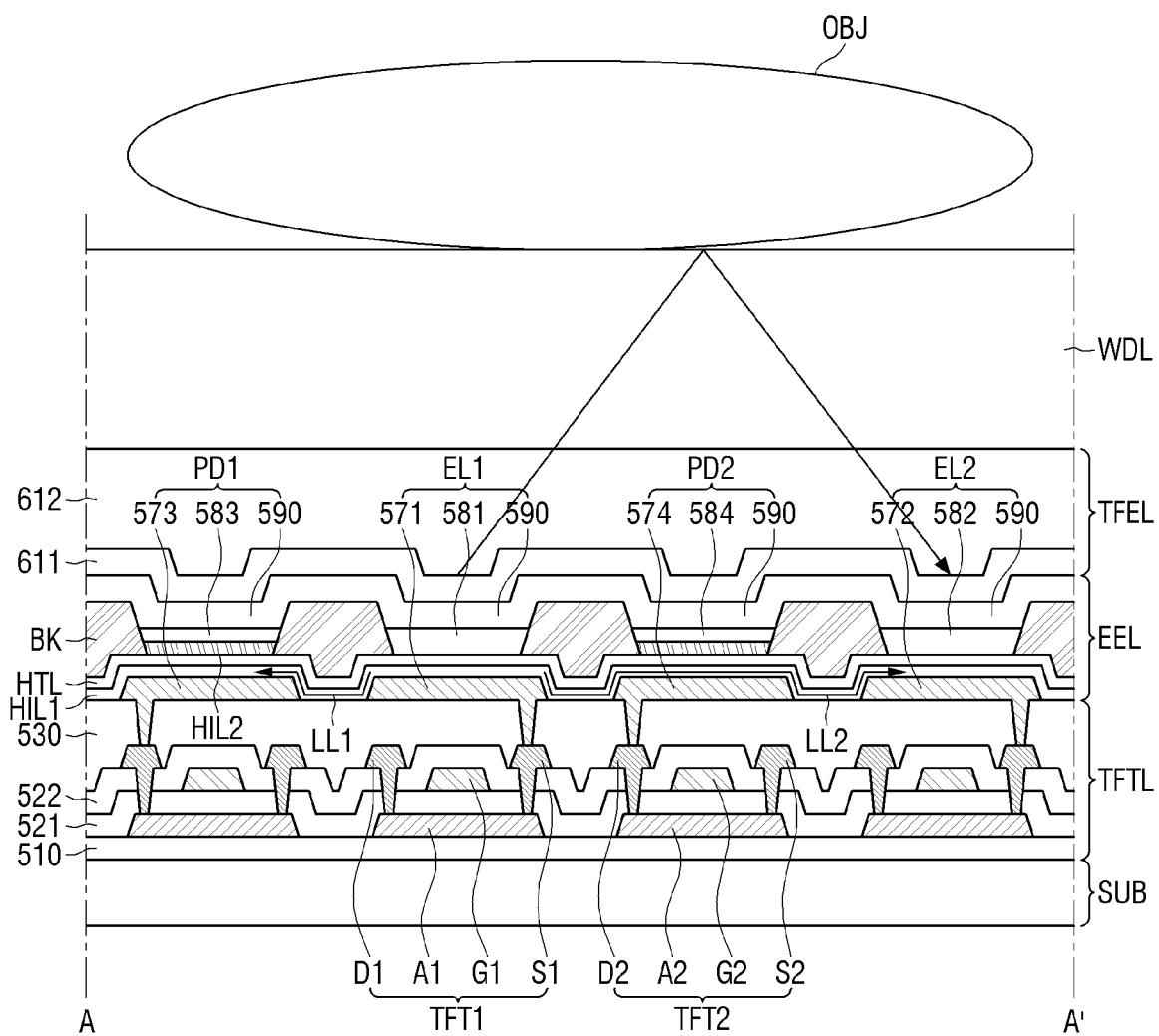
FIG. 16 is a cross-sectional view illustrating pixels and photosensors according to an embodiment.

The light emitting element EL may be, for example, an organic light emitting diode including an organic light emitting layer disposed between an anode electrode and a cathode electrode. Alternatively, the light emitting element EL may be a quantum dot light emitting element including a quantum dot light emitting layer disposed between an anode electrode and a cathode electrode. Alternatively, the light emitting element EL may be an inorganic light emitting element including an inorganic semiconductor disposed between an anode electrode and a cathode electrode. When the light emitting element EL is the inorganic light emitting element, the light emitting element EL may include a micro light emitting diode or a nano light emitting diode. In FIG. 16, the anode electrode of the light emitting element EL corresponds to pixel electrodes 571 and 572, and the cathode electrode of the light emitting element EL corresponds to a common electrode 590.

The anode electrode of the light emitting element EL may be connected to a second electrode of the fifth transistor T5 and a first electrode of the sixth transistor T6, and the cathode electrode of the light emitting element EL may be connected to a common voltage line VSL to which the common voltage ELVSS is applied.

The first transistor T1 is turned on by a k-th scan signal of the k-th scan line GWLk to connect the first electrode of the driving transistor DT to the j-th data line DLj. Accordingly, a data voltage of the j-th data line DLj may be applied to the first electrode of the driving transistor DT. A gate electrode of the first transistor T1 may be connected to the k-th scan line GWLk, a first electrode of the first transistor T1 may be connected to the j-th data line DLj, and a second electrode of the first transistor T1 may be connected to the first electrode of the driving transistor DT.

The second transistor T2 is turned on by a k-th scan control signal of the k-th scan control line GCLk to connect the gate electrode and the second electrode of the driving transistor DT to each other. When the gate electrode and the second electrode of the driving transistor DT are connected to each other, the driving transistor DT is driven as a diode. A gate electrode of the second transistor T2 may be connected to the k-th scan control line GCLk, a first electrode of the second transistor T2 may be connected to the gate electrode of the driving transistor DT, and a second electrode of the second transistor T2 may be connected to the second electrode of the driving transistor DT.

The third transistor T3 is turned on by a k-th scan initialization signal of the k-th scan initialization line GILk to connect the gate electrode of the driving transistor DT to a first initialization voltage line VIL1. Accordingly, a first initialization voltage VINT of the first initialization voltage line VIL1 may be applied to the gate electrode of the driving transistor DT. A gate electrode of the third transistor T3 may be connected to the k-th scan initialization line GILk, a first electrode of the third transistor T3 may be connected to the first initialization voltage line VIL1, and a second electrode of the third transistor T3 may be connected to the gate electrode of the driving transistor DT.

The fourth transistor T4 is turned on by a k-th emission control signal of a k-th emission control line EMLk to connect the first electrode of the driving transistor DT to a driving voltage line VDL to which the driving voltage ELVDD is applied. A gate electrode of the fourth transistor T4 may be connected to the k-th emission control line EMLk, a first electrode of the fourth transistor T4 may be connected to the driving voltage line VDL, and a second electrode of the fourth transistor T4 may be connected to the first electrode of the driving transistor DT.

The fifth transistor T5 is turned on by a k-th emission control signal of the k-th emission control line EMLk to connect the second electrode of the driving transistor DT to the anode electrode of the light emitting element EL. A gate electrode of the fifth transistor T5 may be connected to the k-th emission control line EMLk, a first electrode of the fifth transistor T5 may be connected to the second electrode of the driving transistor DT, and the second electrode of the fifth transistor T5 may be connected to the anode electrode of the light emitting element EL.

When both the fourth transistor T4 and the fifth transistor T5 are turned on, the driving current Isd of the driving transistor DT according to the voltage applied to the gate electrode of the driving transistor DT may flow to the light emitting element EL.

The sixth transistor T6 is turned on by a k−1-th scan signal of the k−1-th scan line GWLk−1 to connect the anode electrode of the light emitting element EL to a second initialization voltage line VIL2. A second initialization voltage VAINT of the second initialization voltage line VIL2 may be applied to the anode electrode of the light emitting element EL. A gate electrode of the sixth transistor T6 may be connected to the k−1-th scan line GWLk−1, the first electrode of the sixth transistor T6 may be connected to the anode electrode of the light emitting element EL, and a second electrode of the sixth transistor T6 may be connected to the second initialization voltage line VIL2.

The first capacitor Cst is formed between the gate electrode of the driving transistor DT and the driving voltage line VDL. A first capacitor electrode of the first capacitor Cst may be connected to the gate electrode of the driving transistor DT, and a second capacitor electrode of the first capacitor Cst may be connected to the driving voltage line VDL.

When the first electrode of each of the driving transistor DT and the first to sixth transistors T1, T2, T3, T4, T5, and T6 is a source electrode, the second electrode of each of the driving transistor DT and the first to sixth transistors T1, T2, T3, T4, T5, and T6 may be a drain electrode. Alternatively, when the first electrode of each of the driving transistor DT and the first to sixth transistors T1, T2, T3, T4, T5, and T6 is a drain electrode, the second electrode of each of the driving transistor DT and the first to sixth transistors T1, T2, T3, T4, T5, and T6 may be a source electrode.

An active layer of each of the driving transistor DT and the first to sixth transistors T1, T2, T3, T4, T5, and T6 may be made of any one of, for example, polysilicon, amorphous silicon, and an oxide semiconductor. For example, the active layer of each of the driving transistor DT, the first transistor T1, and the fourth to sixth transistors T4 to T6 may be made of polysilicon. The active layer of each of the second transistor T2 and the third transistor T3 may be made of an oxide semiconductor. In this case, the driving transistor DT, the first transistor T1, and the fourth to sixth transistors T4 to T6 may be formed as P-channel metal oxide semiconductor field effect transistors (MOSFETs), and the second transistor T2 and the third transistor T3 may be formed as N-channel MOSFETs.

Each of the plurality of photosensors PS may include a photoelectric conversion element PD, a plurality of sensing transistors, and various signal lines. The photoelectric conversion element PD includes light sensing parts PS1 and PS2 (see FIG. 8) that sense external light. The plurality of sensing transistors may include first to third sensing transistors LT1, LT2, and LT3.

Each of the photoelectric conversion elements PD may be a photodiode including a sensing anode electrode, a sensing cathode electrode, and a photoelectric conversion layer disposed between the sensing anode electrode and the sensing cathode electrode. Each of the photoelectric conversion elements PD may convert light incident from outside of the display device 1 into an electrical signal. The photoelectric conversion element PD may be an inorganic photodiode or a phototransistor made of a pn-type or pin-type inorganic material. Alternatively, the photoelectric conversion element PD may be an organic photodiode including an electron donating material generating donor ions and an electron accepting material generating acceptor ions. In FIG. 16, the sensing anode electrode of the photoelectric conversion element PD corresponds to light receiving electrodes 573 and 574, and the sensing cathode electrode of the photoelectric conversion element PD corresponds to a common electrode 590.

The photoelectric conversion element PD may generate photocharges when it is exposed to external light, and the generated photocharges may be accumulated in the sensing anode electrode of the photoelectric conversion element PD. In this case, a voltage of a first node N1 electrically connected to the sensing anode electrode 580 (see FIG. 16) may increase. When the photoelectric conversion element PD and the q-th read-out line ROLq are connected to each other according to a turn-on of the first and third sensing transistors LT1 and LT3, a sensing voltage may be accumulated at a third node N3 between the q-th read-out line ROLq and the third sensing transistor LT3 in proportion to the voltage of the first node N1 in which the charges are accumulated.

The first sensing transistor LT1 may be turned on by the voltage of the first node N1 applied to a gate electrode thereof to connect the second initialization voltage line VIL2 and a first electrode of the third sensing transistor LT3 to each other. The gate electrode of the first sensing transistor LT1 may be connected to the first node N1, a first electrode of the first sensing transistor LT1 may be connected to the second initialization voltage line VIL2, and a second electrode of the first sensing transistor LT1 may be connected to the first electrode of the third sensing transistor LT3. The first sensing transistor LT1 may be a source follower amplifier that generates a source-drain current in proportion to a quantity of charges of the first node N1 input to a gate electrode thereof. While it has been illustrated that the first electrode of the first sensing transistor LT1 is connected to the second initialization voltage line VIL2, the disclosure is not limited thereto, and the first electrode of the first sensing transistor LT1 may be connected to the driving voltage line VDL or the first initialization voltage line VIL1 according to embodiments.

The second sensing transistor LT2 may be turned on by a k-th reset control signal of the k-th reset control line RSTLk to connect the first node N1 to a reset voltage line VRL for applying a reset voltage Vrst. A gate electrode of the second sensing transistor LT2 may be connected to the k-th reset control line RSTLk, a first electrode of the second sensing transistor LT2 may be connected to the reset voltage line VRL, and a second electrode of the second sensing transistor LT2 may be connected to the first node N1.

The third sensing transistor LT3 may be turned on by a k-th scan signal of the k-th scan line GWLk to connect the second electrode of the first sensing transistor LT1 and the q-th read-out line ROLq to each other. A gate electrode of the third sensing transistor LT3 may be connected to the k-th scan line GWLk, the first electrode of the third sensing transistor LT3 may be connected to the second electrode of the first sensing transistor LT1, and a second electrode of the third sensing transistor LT3 may be connected to the third node N3 and the q-th read-out line ROLq.

An active layer of each of the first to third sensing transistors LT1, LT2, and LT3 may be made of any one of, for example, polysilicon, amorphous silicon, and an oxide semiconductor. For example, the active layers of the first sensing transistor LT1 and the third sensing transistor LT3 may be made of polysilicon. The active layer of the second sensing transistor LT2 may be made of an oxide semiconductor. In this case, the first sensing transistor LT1 and the third sensing transistor LT3 may be formed as P-channel MOSFETs, and the second sensing transistor LT2 may be formed as an N-channel MOSFET.

However, as described above, when the light emitting element EL emits the light according to the emission current, a leakage current LL may be generated from the light emitting element EL to the photoelectric conversion element PD adjacent to the light emitting element EL. The leakage current LL may be a portion of the emission current generated when the light emitting element EL emits the light. The leakage current LL may flow to the sensing anode electrode of the photoelectric conversion element PD through an electron transport layer disposed on the anode electrode of the light emitting element EL and the sensing anode electrode 580 of the photoelectric conversion element PD. That is, the leakage current LL may be generated from the anode electrode of the light emitting element EL to the sensing anode electrode of the photoelectric conversion element PD through the electron transport layer.

Accordingly, the voltage of the first node N1 connected to the sensing anode electrode of the photoelectric conversion element PD may be different from a voltage generated by generating the photocharges when the photoelectric conversion element PD is exposed to the external light. That is, the voltage of the first node N1 may include an influence of the sensed current and the leakage current LL. Accordingly, when light is sensed by the photoelectric conversion element PD adjacent to the light emitting element EL, the fingerprint F pattern of the finger may be incorrectly identified.

Figure 5:
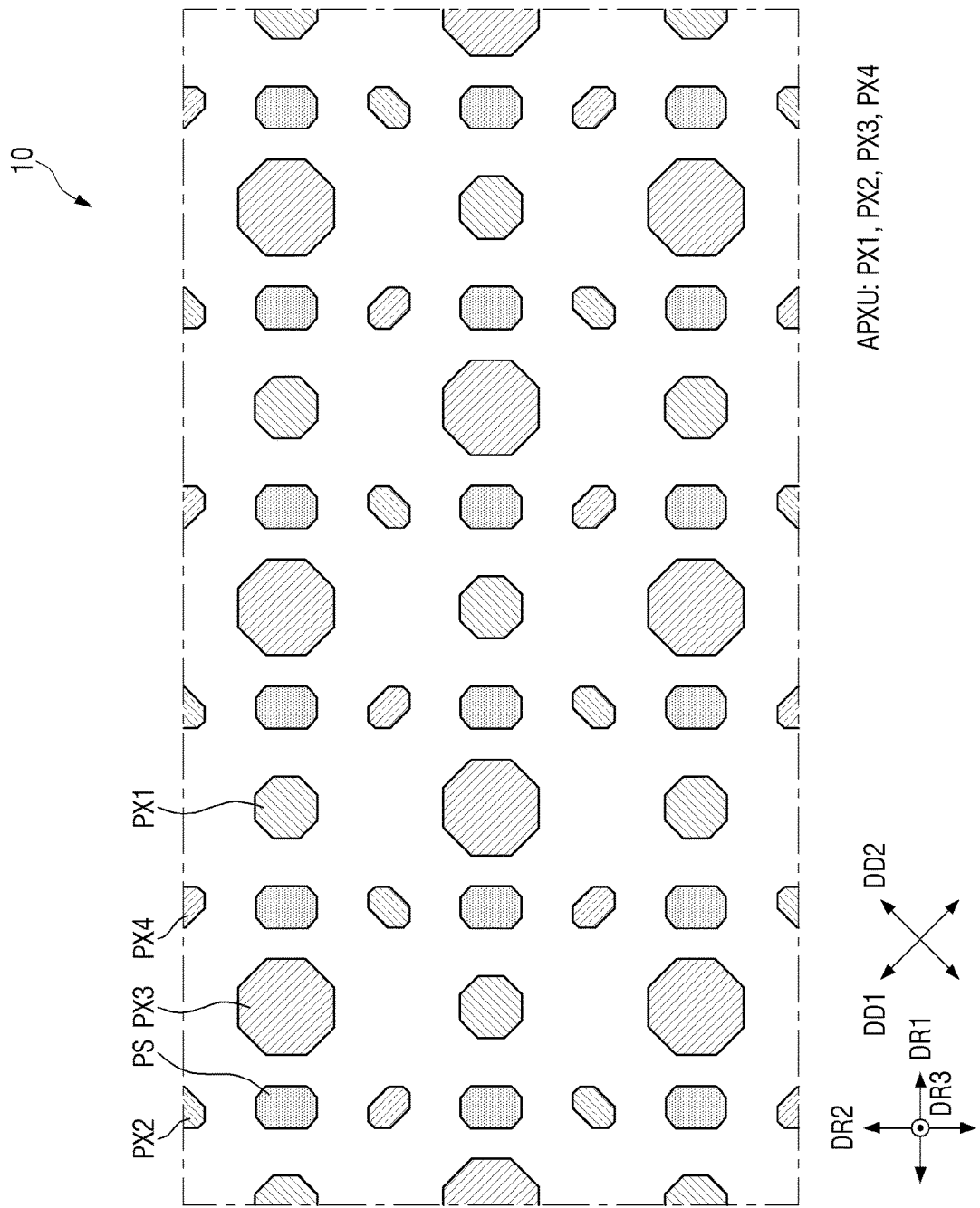
FIG. 5 is a plan view illustrating an arrangement relationship between pixels and photosensors according to an embodiment.

FIG. 5 is a plan view illustrating an arrangement relationship between pixels and photosensors according to an embodiment.

Referring to FIG. 5, a plurality of pixels PX and a plurality of photosensors PS may be repeatedly disposed in the display device 1.

The plurality of pixels PX may include first sub-pixels PX1, second sub-pixels PX2, third sub-pixels PX3, and fourth sub-pixels PX4. For example, the first sub-pixels PX1 may emit light of a red wavelength, the second sub-pixels PX2 and the fourth sub-pixels PX4 may emit light of a green wavelength, and the third sub-pixels PX3 may emit light of a blue wavelength. The plurality of pixels PX may include a plurality of emission areas that emit light, respectively. The plurality of photosensors PS may include a plurality of light sensing areas that sense light incident thereon.

The first sub-pixels PX1, the second sub-pixels PX2, the third sub-pixels PX3, and the fourth sub-pixels PX4 and the plurality of photosensors PS may be alternately arranged in the first direction DR1 and the second direction DR2 crossing the first direction DR1. In an embodiment, the first sub-pixels PX1 and the third sub-pixels PX3 may be alternately arranged while forming a first row along the first direction DR1, and the second sub-pixels PX2 and the fourth sub-pixels PX4 may be repeatedly arranged along the first direction in a second row adjacent to the first row. Pixels PX belonging to the first row may be misaligned with pixels PX belonging to the second row in the first direction DR1. Arrangements of the first row and the second row may be repeated up to an n-th row.

For example, the first sub-pixel PX1 and the fourth sub-pixel PX4 may be arranged in a first diagonal direction DD1 crossing the first direction DR1 and the second direction DR2, and the second sub-pixels PX2 and the third sub-pixels PX3 may be arranged in the first diagonal direction DD1. The second sub-pixels PX2 and the third sub-pixels PX3 may be arranged in a second diagonal direction DD2 crossing the first diagonal direction DD1, and the first sub-pixels PX1 and the fourth sub-pixels PX4 may be arranged in the second diagonal direction DD2. The first diagonal direction DD1 may be a direction obliquely inclined between the first and second directions DR1 and DR2, and the second diagonal direction DD2 may be a direction orthogonal to the first diagonal direction DD1. For example, the first diagonal direction DD1 may be a direction inclined with respect to the first direction DR1 and the second direction DR2 by about 45°, but is not limited thereto.

The photosensors PS may be disposed between the first sub-pixels PX1 and the third sub-pixels PX3 forming the first row and may be spaced apart from each other. The first sub-pixels PX1, the photosensors PS, and the third sub-pixels PX3 may be alternately arranged along the first direction DR1. The photosensors PS may be disposed between the second sub-pixels PX2 and the fourth sub-pixels PX4 forming the second row and be spaced apart from each other. The second sub-pixels PX2, the photosensors PS, and the fourth sub-pixels PX4 may be alternately arranged along the first direction DR1. The number of photosensors PS in the first row may be the same as the number of photosensors PS in the second row. Arrangements of the first row and the second row may be repeated up to an n-th row.

Sizes of emission areas of respective fingerprint display pixels may be different from each other. Sizes of emission areas of the second sub-pixels PX2 and the fourth sub-pixels PX4 may be smaller than those of emission areas of the first sub-pixels PX1 or the third sub-pixels PX3. While it has been illustrated in FIG. 5 that the respective pixels PX have an octagonal shape, the disclosure is not limited thereto, and the respective pixels PX have may have a rectangular shape, a quadrangular shape, a circular shape, or other polygonal shapes according to embodiments.

One fingerprint display pixel unit APXU may include one first sub-pixel PX1, one second sub-pixel PX2, one third sub-pixel PX3, and one fourth sub-pixel PX4. The fingerprint display pixel unit APXU refers to a group of color pixels capable of expressing a gradation.

Figure 6:
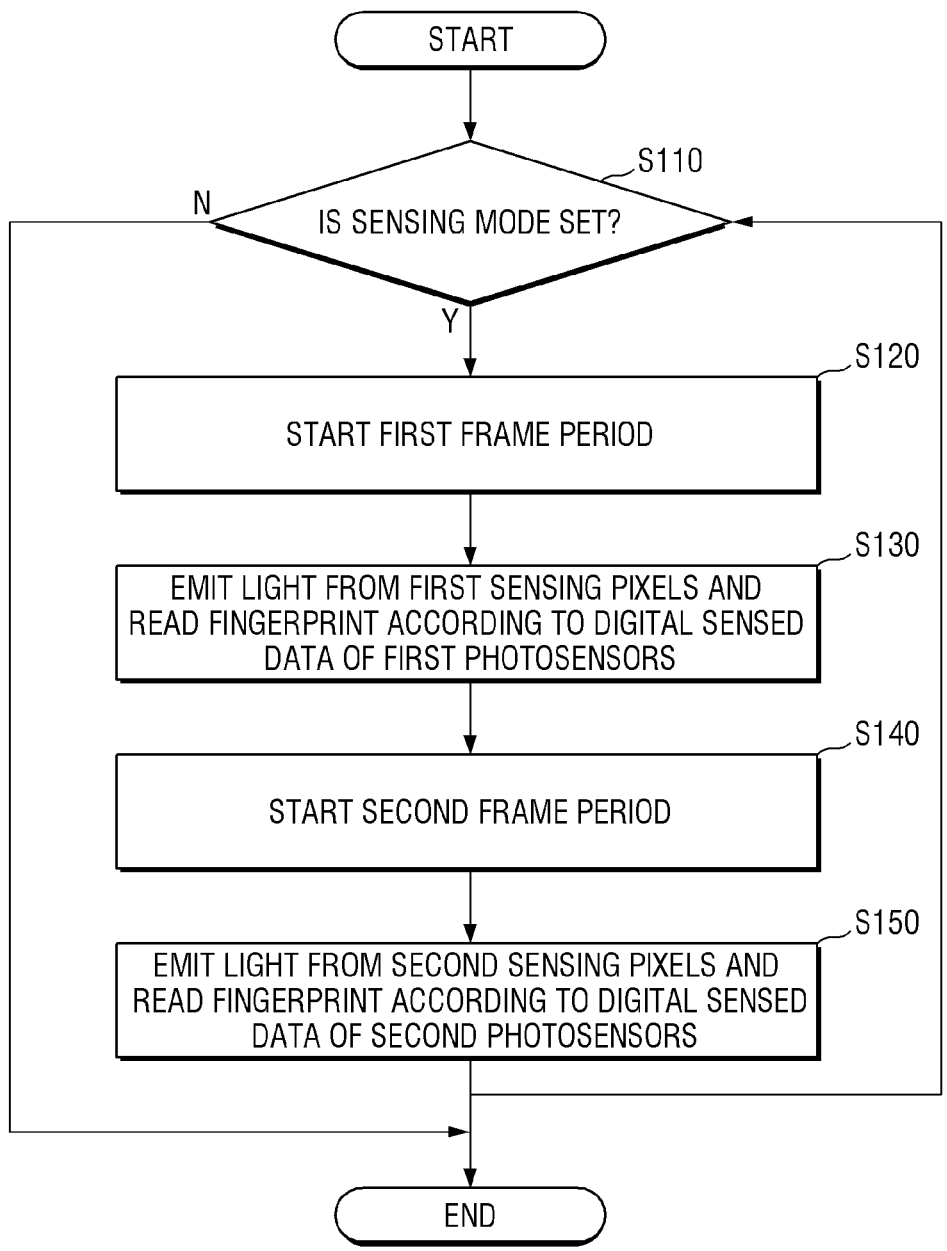
FIG. 6 is a flowchart illustrating a method of reading a fingerprint by the display device according to an embodiment.
Figure 7:
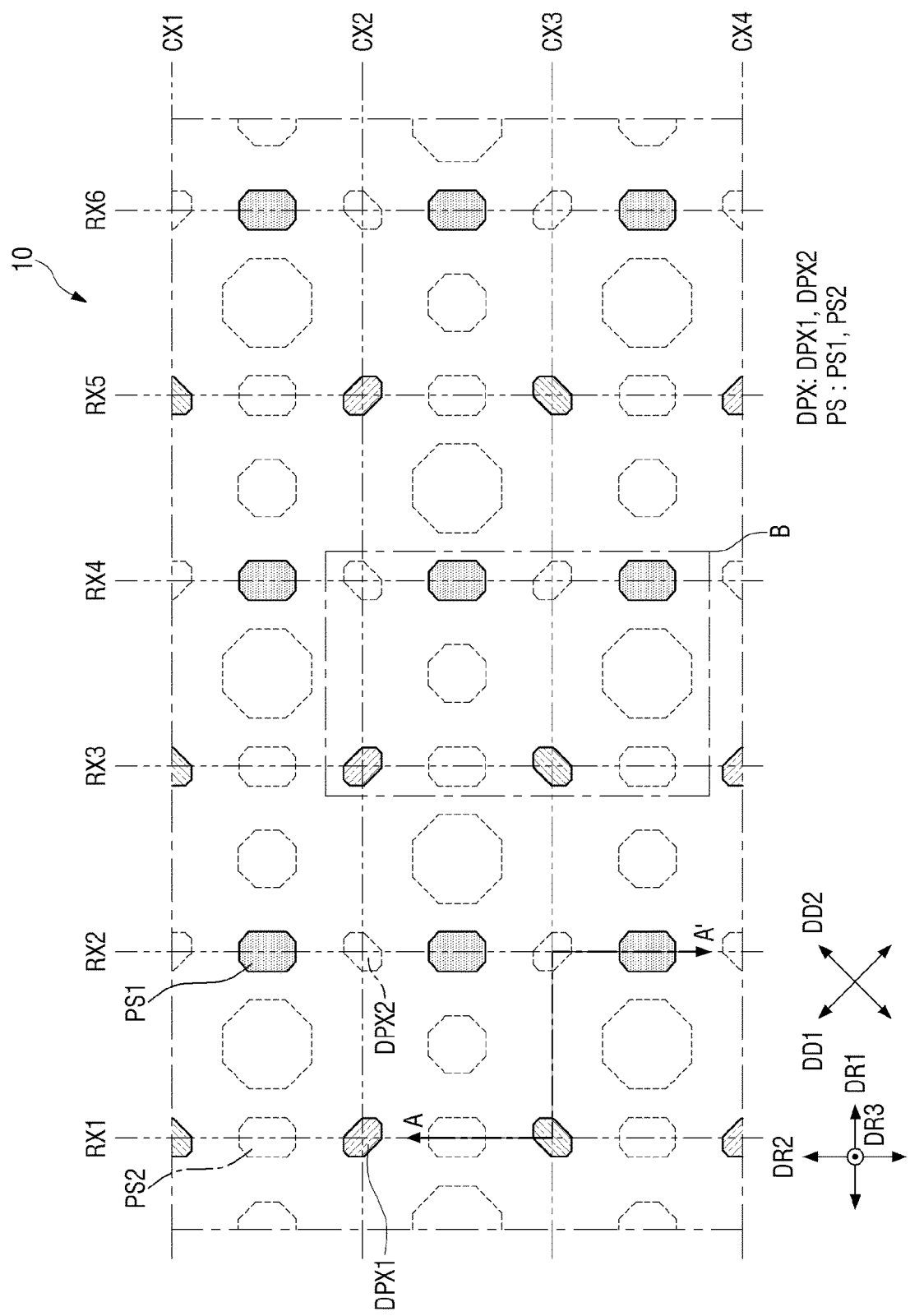
FIG. 7 is a plan view illustrating pixels emitting light and sensible photosensors during a first frame period according to an embodiment.
Figure 8:
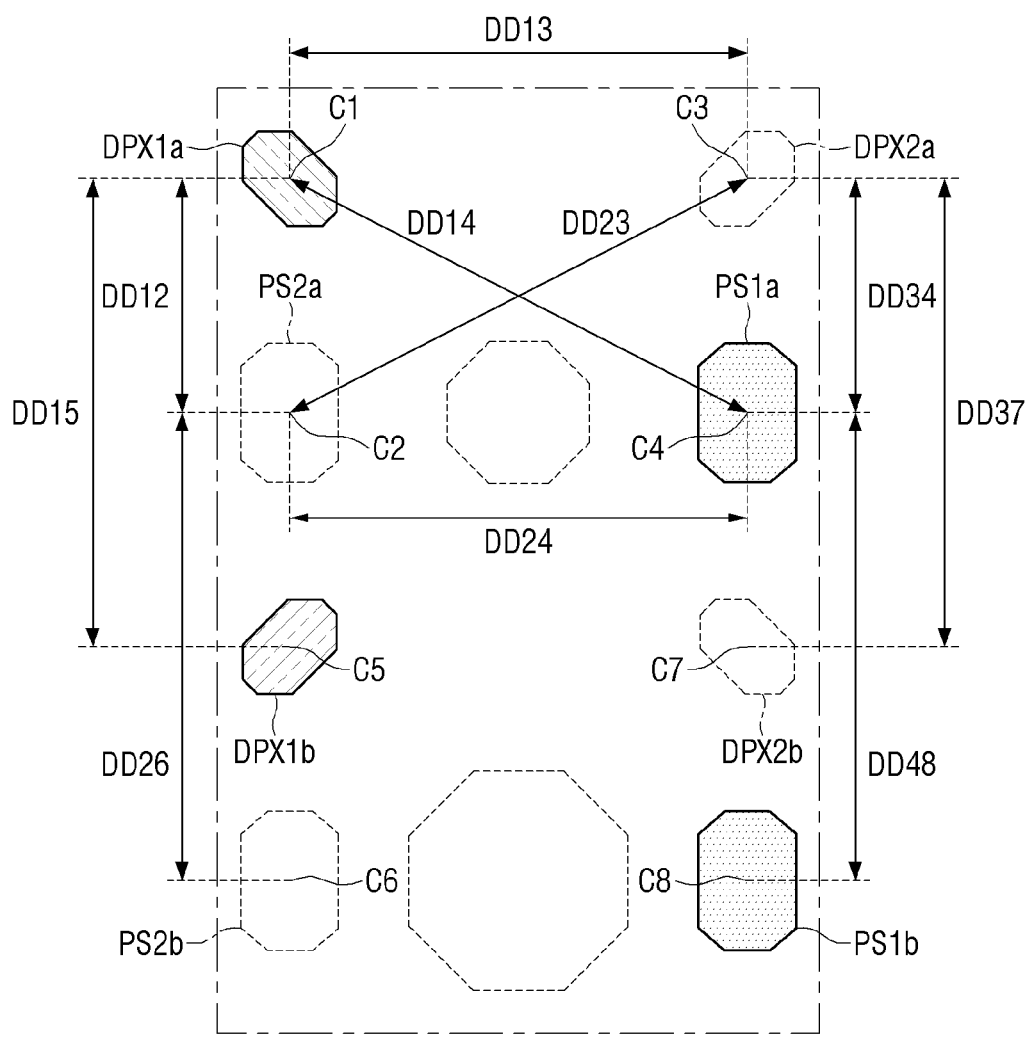
FIG. 8 is an enlarged plan view of portion B of FIG. 7 according to an embodiment.
Figure 9:
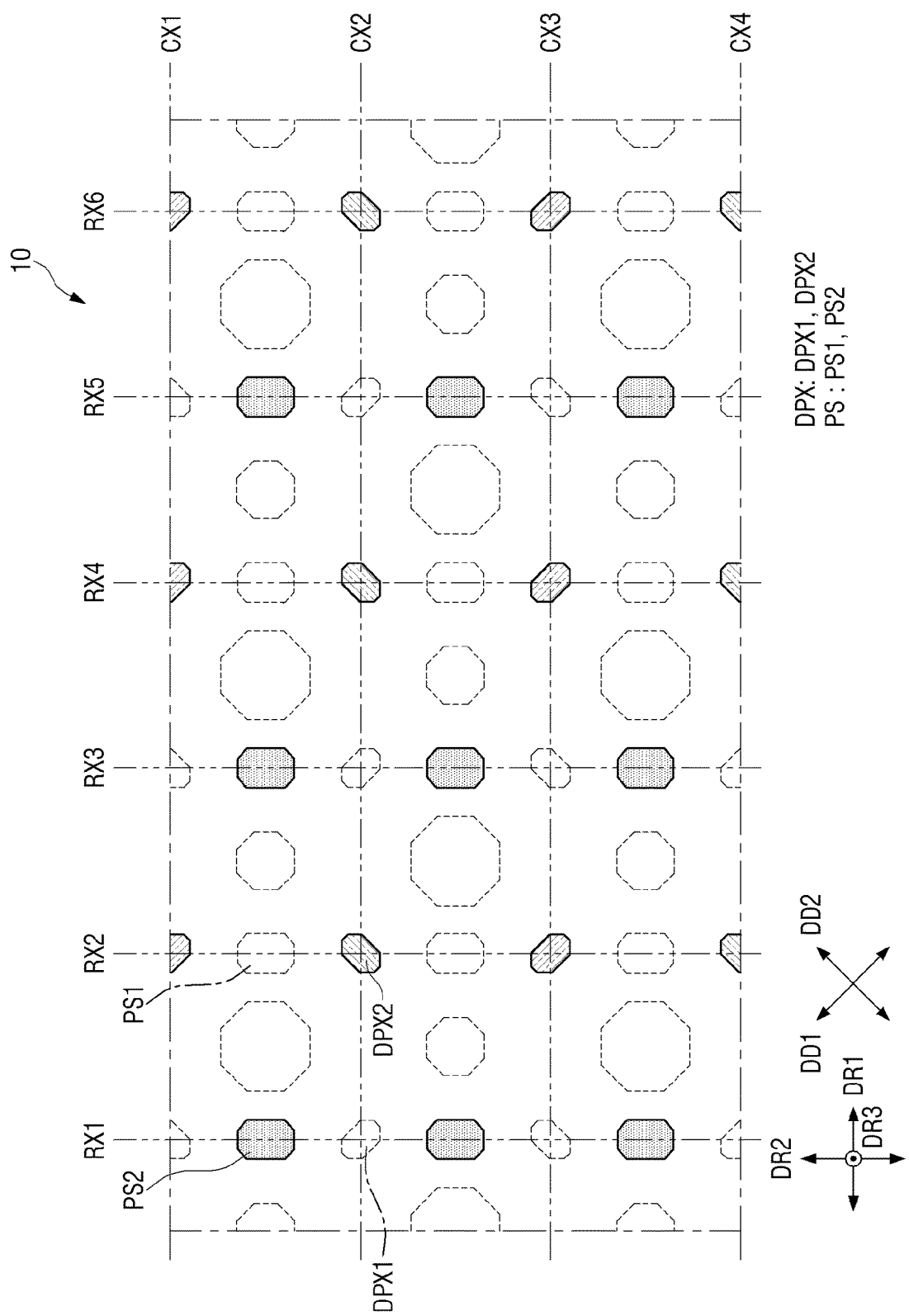
FIG. 9 is a plan view illustrating pixels emitting light and sensible photosensors during a second frame period according to an embodiment.
Figure 10:
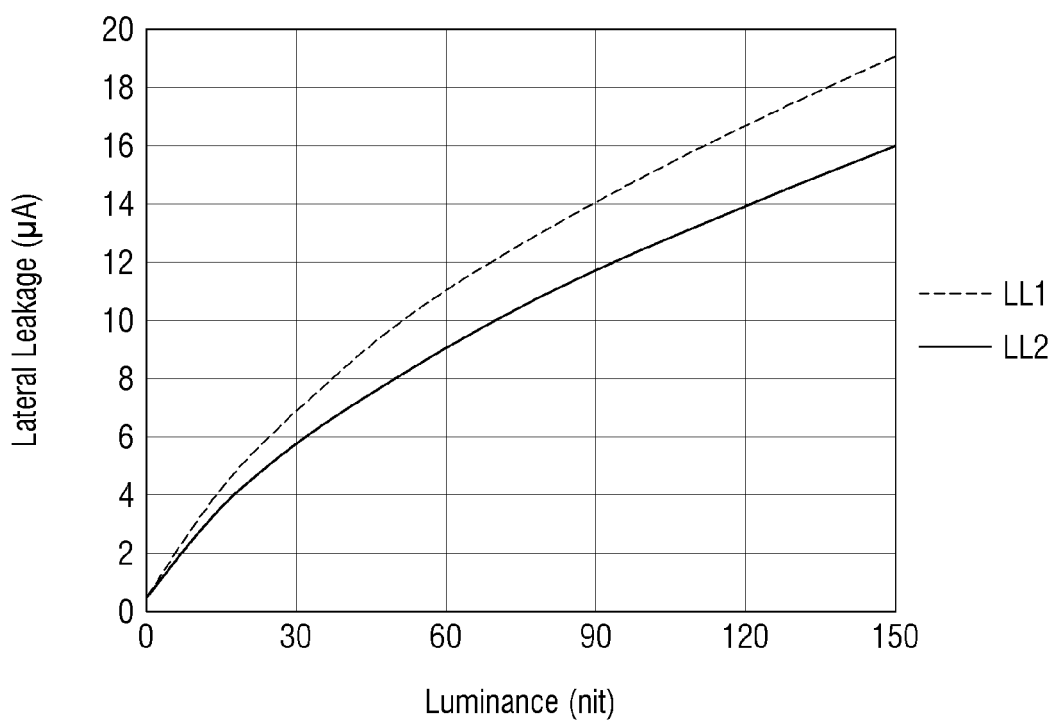
FIG. 10 is a graph illustrating an amount of leakage current according to luminance according to an embodiment.

FIG. 6 is a flowchart illustrating a method of reading a fingerprint by the display device according to an embodiment. FIG. 7 is a plan view illustrating pixels emitting light and sensible photosensors during a first frame period according to an embodiment. FIG. 8 is an enlarged plan view of portion B of FIG. 7 according to an embodiment. FIG. 9 is a plan view illustrating pixels emitting light and sensible photosensors during a second frame period according to an embodiment. FIG. 10 is a graph illustrating an amount of leakage current according to luminance according to an embodiment.

Referring to FIG. 6, first, when a mode of the display device 1 is set to a sensing mode for sensing a fingerprint (S110), the processor 70 may start a first frame period (S120). First sensing pixels DPX1 emit light during the first frame period, and the processor 70 reads the fingerprint according to digital sensed data of first photosensors PS1 (S130).

Hereinafter, pixels that emit light during the first frame period are defined as first sensing pixels DPX1, and pixels that do not emit light during the first frame period are defined as second sensing pixels DPX2. In addition, sensors reading a fingerprint image according to digital sensed data generated by sensing light during the first frame period are defined as first photosensors PS1, and photosensors PS excluding the generated digital sensed data are defined as second photosensors PS2. That is, according to an embodiment, during the first frame period, the first sensing pixels DPX1 may emit the light and the second sensing pixels DPX2 do not emit the light. In addition, in an embodiment, the fingerprint image may be read according to the digital sensed data obtained by the first photosensors PS1 and the digital sensed data obtained by the second photosensors PS2 is not used.

Referring to FIG. 7, sensing pixels DPX emitting light and sensible photosensors PS during the first frame period are illustrated.

The first sensing pixels DPX1 may be arranged in odd columns. The odd columns may extend along the second direction DR2. In FIG. 7, the first sensing pixels DPX1 may be arranged along the second direction DR2 in a first column RX1, a third column RX3, and a fifth column RX5 of first to sixth columns RX1 to RX6. The first sensing pixels DPX1 may be arranged alternately with the second photosensors PS2 in the odd columns as illustrated in FIG. 7. In addition, the first sensing pixels DPX1 may be arranged alternately with the second sensing pixels DPX2 along first to fourth rows CX1 to CX4. The first sensing pixels DPX1 may emit green light. The first sensing pixels DPX1 may be the second sub-pixels PX2 or the fourth sub-pixels PX4.

The second sensing pixels DPX2 may be arranged in even columns. The even columns may extend along the second direction DR2. In FIG. 7, the second sensing pixels DPX2 may be arranged along the second direction DR2 in the second column RX2, the fourth column RX4, and the sixth column RX6 of the first to sixth columns RX1 to RX6. The second sensing pixels DPX2 may be arranged alternately with the first photosensors PS1 in the even columns. In addition, the second sensing pixels DPX2 may be arranged alternately with the first sensing pixels DPX1 along the first to fourth rows CX1 to CX4. The second sensing pixels DPX2 may neighbor (e.g., be adjacent to) the first sensing pixels DPX1 in the first direction DR1.

The first photosensors PS1 may be arranged in the even columns. The even columns may extend along the second direction DR2. In FIG. 7, the first photosensors PS1 may be arranged along the second direction DR2 in the second column RX2, the fourth column RX4, and the sixth column RX6 of the first to sixth columns RX1 to RX6. In addition, the first photosensors PS1 may be arranged alternately with the second sensing pixels DPX2 in the even columns. In addition, the first photosensors PS1 may neighbor (e.g., be adjacent to) the second sensing pixels in the second direction DR2.

The second photosensors PS2 may be arranged in the odd columns. The odd columns may extend along the second direction DR2. In FIG. 7, the second photosensors PS2 may be arranged along the second direction DR2 in the first column RX1, the third column RX3, and the fifth column RX5 of the first to sixth columns RX1 to RX6. In addition, the second photosensors PS2 may be arranged alternately with the first sensing pixels DPX1 in the odd columns. In addition, the second photosensors PS2 may be neighbor (e.g., be adjacent to) the first sensing pixels in the second direction DR2. The second photosensors PS2 and the first photosensors PS1 may neighbor (e.g., be adjacent to) each other in the first direction DR1.

However, the first sensing pixels DPX1, the second sensing pixels DPX2, the first photosensors PS1, and the second photosensors PS2 are not limited to being arranged in the first to sixth columns RX1 to RX6, and may be arranged in K columns and rows, where K is a positive integer.

Referring to FIG. 8, as described above, due to arrangement positions and planar shapes of the first sensing pixels DPX1, the second sensing pixels DPX2, the first photosensors PS1, and the second photosensors PS2, a distance DD15 between a center C1 of a 1a-th first sensing pixel DPX1a and a center C5 of a 1b-th sensing pixel DPX1b may be substantially the same as a distance DD37 between a center C3 of a 2a-th sensing pixel DPX2a and a center C7 of a 2b-th sensing pixel DPX2b. In addition, a distance DD48 between a center C4 of a 1a-th photosensor PS1a and a center C8 of a 1b-th photosensor PS1b may be substantially the same as a distance DD26 between a center C2 of a 2a-th photosensor PS2a and a center C6 of a 2b-th photosensor PS2b.

Hereinafter, distances between the sensing pixels DPX and the photosensors PS are defined as distances between the center C1 of the 1a-th first sensing pixel DPX1a, the center C5 of the 1b-th sensing pixel DPX1b, the center C3 of the 2a-th sensing pixel DPX2a, the center C7 of the 2b-th sensing pixel DPX2b, the center C4 of the 1a-th photosensor PS1a, the center C8 of the 1b-th photosensor PS1b, the center C2 of the 2a-th photosensor PS2a, and the center C6 of the 2b-th photosensor PS2b.

Due to the arrangement positions and the planar shapes of the first sensing pixels DPX1, the second sensing pixels DPX2, the first photosensors PS1, and the second photosensors PS2, a first distance DD14 between the 1a-th sensing pixel DPX1a and the 1a-th photosensor PS1a adjacent to the 1a-th sensing pixel DPX1a among the first photosensors PS1 may be greater than a second distance DD12 between the 1a-th sensing pixel DPX1a and the 2a-th photosensor PS2a adjacent to the 1a-th sensing pixel DPX1a among the second photosensors PS2.

In addition, a fifth distance DD13 between the 1a-th sensing pixel DPX1a and the 2a-th sensing pixel adjacent to the 1a-th sensing pixel DPX1a among the second sensing pixels DPX2 may be the same as the distance DD15 between the 1a-th sensing pixel DPX1a and the 1b-th sensing pixels DPX1b adjacent to the 1a-th sensing pixel DPX1a among the first sensing pixels DPX1. The fifth distance DD13 may be the same as the distance DD37 between the 2a-th sensing pixel and the 2b-th sensing pixel adjacent to the 2a-th sensing pixel among the second sensing pixels DPX2. The fifth distance DD13 may be smaller than the first distance DD14 and greater than the second distance DD12.

A third distance DD23 between the 2a-th sensing pixel and the 2a-th photosensor PS2a adjacent to the 2a-th sensing pixel among the second photosensors PS2 may be greater than a fourth distance DD34 between the 2a-th sensing pixel and the 1a-th photosensor PS1a adjacent to the 2a-th sensing pixel among the first photosensors PS1. In addition, the third distance DD23 may be greater than the second distance DD12, and the first distance DD14 may be greater than the fourth distance DD34. In addition, the first distance DD14 may be the same as the third distance DD23, and the second distance DD12 may be the same as the fourth distance DD34.

A sixth distance DD24 between the 1a-th photosensor PS1a and the 2a-th photosensor PS2a adjacent to the 1a-th photosensor PS1a among the second photosensors PS2 may be the same as the distance DD48 between the 1a-th photosensor PS1a and the 1b-th photosensors PS1b adjacent to the 1a-th photosensor PS1a among the first photosensors PS1. In addition, the sixth distance DD24 may be smaller than the distance DD26 between the 2a-th photosensor PS2a and the 2b-th photosensor PS2b adjacent to the 2a-th photosensor PS2a among the second photosensors PS2. The sixth distance DD24 may be greater than the second distance DD12 and smaller than the first distance DD14.

Referring back to FIG. 6, the processor 70 may start a second frame period (S140). The second sensing pixels DPX2 emit light during the second frame period, and the processor 70 reads the fingerprint according to digital sensed data of the second photosensors PS2 (S150).

Referring to FIG. 9, pixels PX emitting light and sensible photosensors PS during the second frame period are illustrated.

Pixels that emit light during the second frame period are defined as second sensing pixels DPX2, and pixels that do not emit light during the second frame period are defined as first sensing pixels DPX1. In addition, sensors reading a fingerprint image according to digital sensed data generated by sensing light during the second frame period are defined as second photosensors PS2, and photosensors PS excluding the generated digital sensed data are defined as first photosensors PS1. That is, in an embodiment, during the second frame period, the second sensing pixels DPX2 may emit the light and the first sensing pixels DPX1 do not emit the light. In addition, in an embodiment, the fingerprint image may be read according to the digital sensed data obtained by the second photosensors PS2 and the digital sensed data obtained by the first photosensors PS1 is not used.

Accordingly, the first sensing pixels DPX1 may emit the light during the first frame period, and the second sensing pixels DPX2 may emit the light during the second frame period. In addition, the fingerprint image may be read according to the first photosensors PS1 during the first frame period, and the fingerprint image may be read according to the second photosensors PS2 during the second frame period. That is, when the pixels PX emit the light in the sensing mode, the fingerprint image may be read according to the photosensors PS that are not adjacent to the pixels PX emitting the light.

Referring back to FIG. 7, finally, the processor 70 may alternately repeat the first frame period and the second frame period in the sensing mode.

Referring to FIG. 10, a first leakage current LL1 (see FIG. 16) refers to a leakage current LL flowing to the second photosensor PS2 adjacent to the sensing pixel when the sensing pixel emits the light. A second leakage current LL2 (see FIG. 16) refers to a leakage current LL flowing to the first photosensor PS1 according to an embodiment of the disclosure when the sensing pixel DPX emits the light.

When the light emitting element EL emits light with the same luminance, a magnitude of the second leakage current LL2 is smaller than that of the first leakage current LL1. For example, when the light emitting element EL emits light with a luminance of about 120 nits, the second leakage current LL2 flowing to the first photosensor PS1 may be about 14 µA, and the first leakage current LL1 flowing to the second photosensor PS2 adjacent to the sensing pixel may be about 16 µA. That is, when the fingerprint is read through the digital sensed data of the first photosensor PS1 according to an embodiment of the disclosure, a magnitude of the leakage current LL may be smaller than when the fingerprint is read through the digital sensed data of the second photosensor PS2 adjacent to the sensing pixel emitting the light.

Accordingly, in an embodiment, when the sensing pixels DPX emit the light, the fingerprint may be accurately read through the digital sensed data of the photosensors PS that are not adjacent to the sensing pixels DPX.

Figure 11:
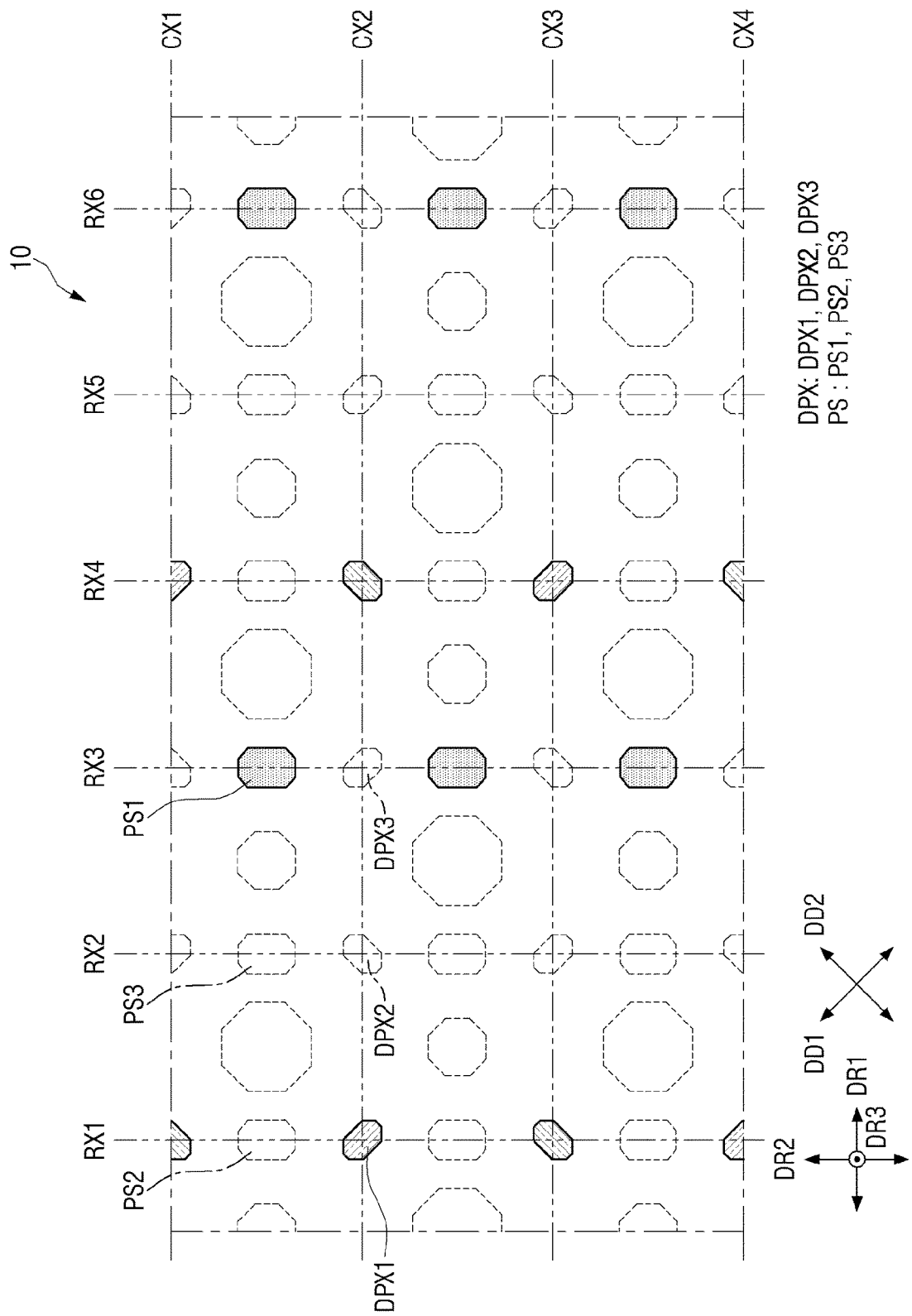
FIG. 11 is a plan view illustrating pixels emitting light and sensible photosensors during a first frame period according to an embodiment.
Figure 12:
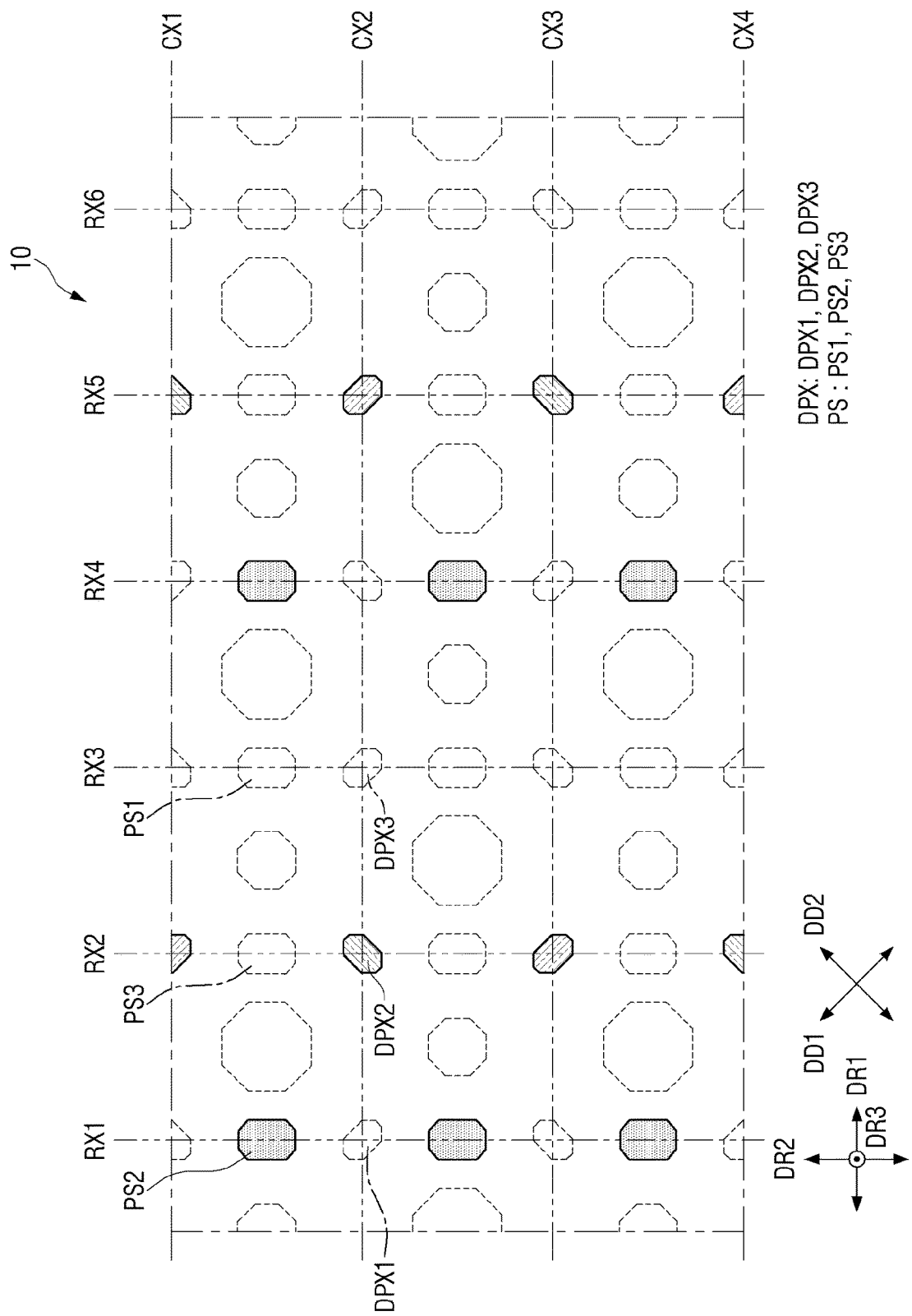
FIG. 12 is a plan view illustrating pixels emitting light and sensible photosensors during a second frame period according to an embodiment.
Figure 13:
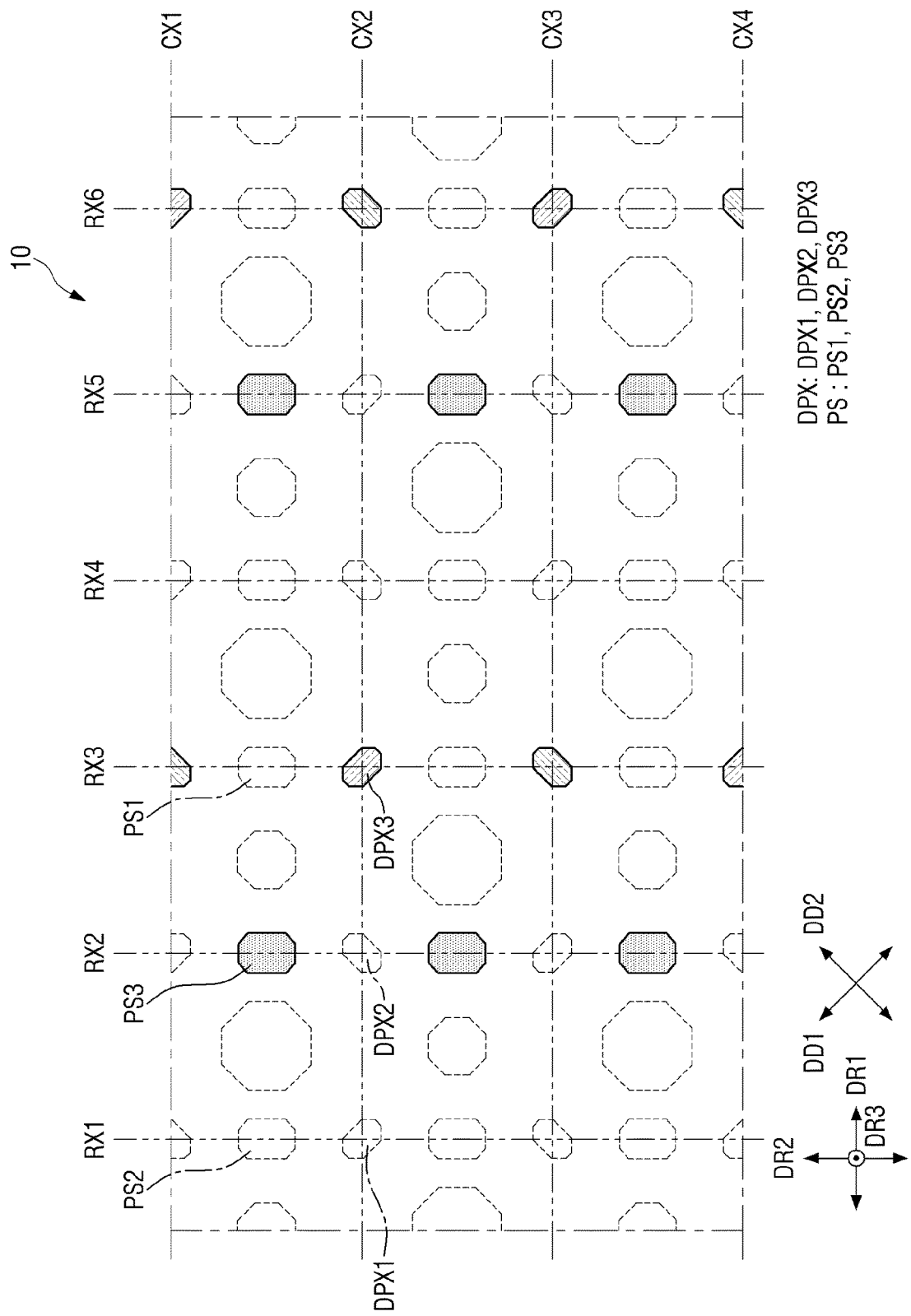
FIG. 13 is a plan view illustrating pixels emitting light and sensible photosensors during a third frame period according to an embodiment.

FIG. 11 is a plan view illustrating pixels emitting light and sensible photosensors during a first frame period according to an embodiment. FIG. 12 is a plan view illustrating pixels emitting light and sensible photosensors during a second frame period according to an embodiment. FIG. 13 is a plan view illustrating pixels emitting light and sensible photosensors during a third frame period according to an embodiment.

An embodiment according to FIGS. 11 to 13 is different from an embodiment according to FIGS. 7 to 10 in that it includes first sensing pixels DPX1, second sensing pixels DPX2, third sensing pixels DPX3, first photosensors PS1, second photosensors PS2, and third photosensors PS3. Accordingly, for convenience of explanation, a further description of elements and technical aspects previously described will be omitted.

A sensing mode may include a first frame period, a second frame period, and a third frame period. The first frame period, the second frame period, and the third frame period may be sequentially repeated in the sensing mode.

Hereinafter, pixels emitting light during the first frame period are defined as first sensing pixels DPX1, pixels emitting light during the second frame period are defined as second sensing pixels DPX2, and pixels emitting light during the third frame period are defined as third sensing pixels DPX3. In addition, sensors reading a fingerprint image according to digital sensed data generated by sensing light during the first frame period are defined as first photosensors PS1, sensors reading a fingerprint image according to digital sensed data generated by sensing light during the second frame period are defined as second photosensors PS2, and sensors reading a fingerprint image according to digital sensed data generated by sensing light during the third frame period are defined as third photosensors PS3. For example, in an embodiment, during the first frame period, the first sensing pixels DPX1 may emit the light and the second sensing pixels DPX2 and the third sensing pixels DPX3 do not emit the light. In addition, the digital sensed data obtained by the second photosensors PS2 and the third photosensors PS3 are not used in an embodiment.

A plurality of columns may include 3N-th columns (where N is a positive integer), 3N−1-th columns, and 3N−2-th columns.

The first sensing pixels DPX1 may be arranged in the 3N−2-th columns (where N is a positive integer). The 3N−2-th columns may extend along the second direction DR2. In FIGS. 11 to 13, the first sensing pixels DPX1 may be arranged along the second direction DR2 in a first column RX1 and a fourth column RX4 of first to sixth columns RX1 to RX6. In addition, the first sensing pixels DPX1 may be arranged alternately with the second photosensors PS2 in the 3N−2-th columns. In addition, the first sensing pixels DPX1 may be arranged alternately with the second sensing pixels DPX2 and the third sensing pixels DPX3 along first to fourth rows CX1 to CX4. The first sensing pixels DPX1 may emit green light. The first sensing pixels DPX1 may be the second sub-pixels PX2 or the fourth sub-pixels PX4.

The second sensing pixels DPX2 may be arranged in the 3N−1-th columns. The 3N−1-th columns may extend along the second direction DR2. In FIGS. 11 to 13, the second sensing pixels DPX2 may be arranged along the second direction DR2 in the second column RX2 and the fifth column RX5 of the first to sixth columns RX1 to RX6. In addition, the second sensing pixels DPX2 may be arranged alternately with the third photosensors PS3 in the 3N−1-th columns. In addition, the second sensing pixels DPX2 may be arranged alternately with the third sensing pixels DPX3 and the first sensing pixels DPX1 along the first to fourth rows CX1 to CX4. The second sensing pixels DPX2 may neighbor (e.g., be adjacent to) the first sensing pixels DPX1 in the first direction DR1.

The third sensing pixels DPX3 may be arranged in the 3N-th columns. The 3N-th columns may extend along the second direction DR2. In FIGS. 11 to 13, the third sensing pixels DPX3 may be arranged along the second direction DR2 in the third column RX3 and the sixth column RX6 of the first to sixth columns RX1 to RX6. In addition, the third sensing pixels DPX3 may be arranged alternately with the first photosensors PS1 in the 3N-th columns. In addition, the third sensing pixels DPX3 may be arranged alternately with the first sensing pixels DPX1 and the second sensing pixels DPX2 along the first to fourth rows CX1 to CX4. The third sensing pixels DPX3 may neighbor (e.g., be adjacent to) the first sensing pixels DPX1 in the first direction DR1.

The first photosensors PS1 may be arranged in the 3N-th columns. In FIGS. 11 to 13, the first photosensors PS1 may be arranged along the second direction DR2 in the third column RX3 and the sixth column RX6 of the first to sixth columns RX1 to RX6. In addition, the first photosensors PS1 may be arranged alternately with the third sensing pixels DPX3 in the 3N-th columns.

The second photosensors PS2 may be arranged in the 3N−2-th columns. In FIGS. 11 to 13, the second photosensors PS2 may be arranged along the second direction DR2 in the first column RX1 and the fourth column RX4 of the first to sixth columns RX1 to RX6. In addition, the second photosensors PS2 may be arranged alternately with the first sensing pixels DPX1 in the 3N−2-th columns.

The third photosensors PS3 may be arranged in the 3N−1-th columns. In FIGS. 11 to 13, the third photosensors PS3 may be arranged along the second direction DR2 in the second column RX2 and the fifth column RX5 of the first to sixth columns RX1 to RX6. In addition, the third photosensors PS3 may be arranged alternately with the second sensing pixels DPX2 in the 3N−1-th columns.

However, the first sensing pixels DPX1, the second sensing pixels DPX2, the third sensing pixels DPX3, the first photosensors PS1, the second photosensors PS2, and third photosensors PS3 are not limited to being arranged in the first to sixth columns RX1 to RX6, and may be arranged in K columns and rows (where K is a positive integer) according to embodiments.

An arrangement relationship between the respective sensing pixels DPX and photosensors PS according to the second frame period and the third frame period is substantially the same as that of an embodiment according to FIGS. 7 to 10, except that light is emitted from 3N columns, as described above. Thus, for convenience of explanation, a further description of elements and technical aspects previously described will be omitted.

Figure 14:
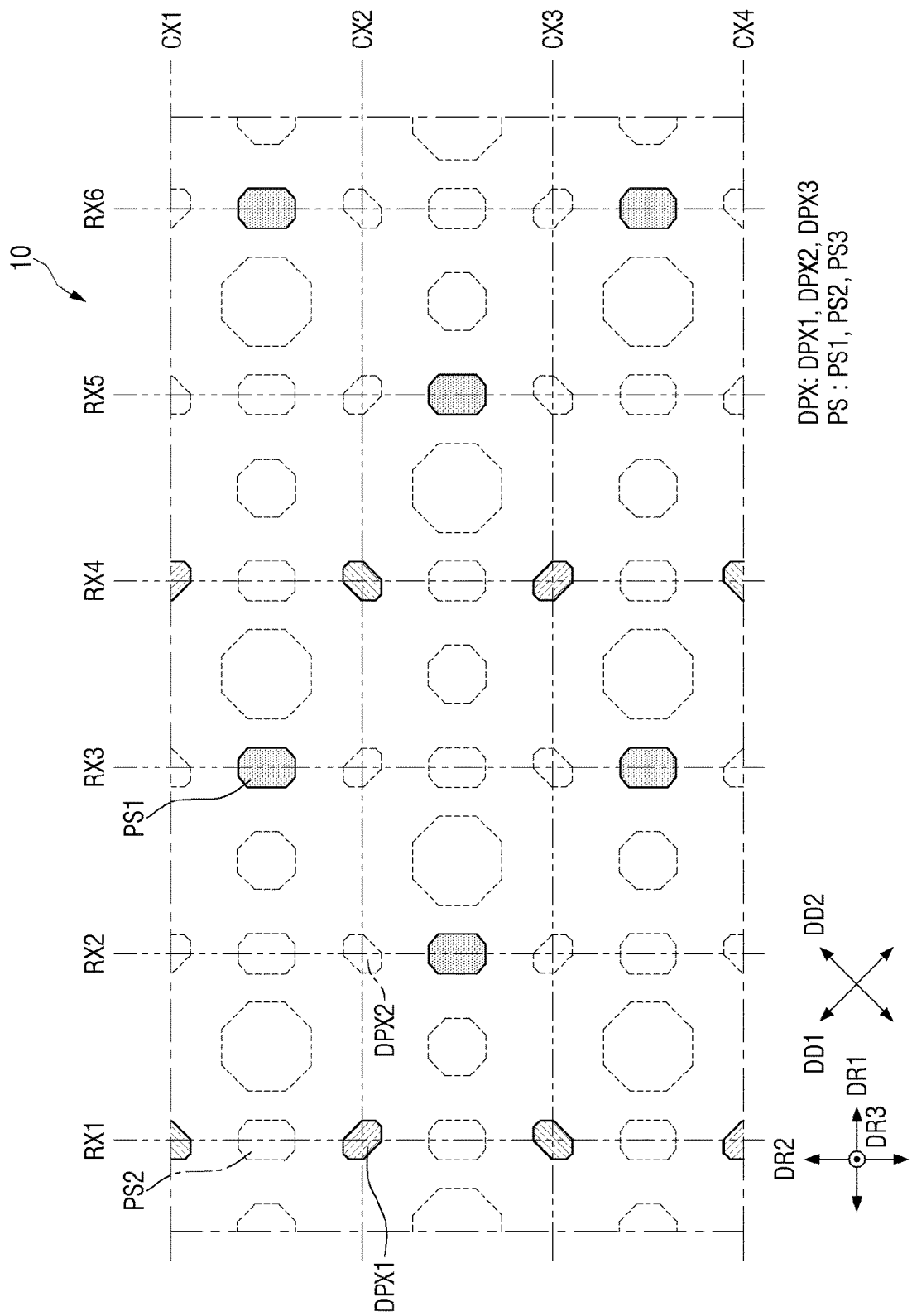
FIG. 14 is a plan view illustrating pixels emitting light and sensible photosensors during a first frame period according to an embodiment.
Figure 15:
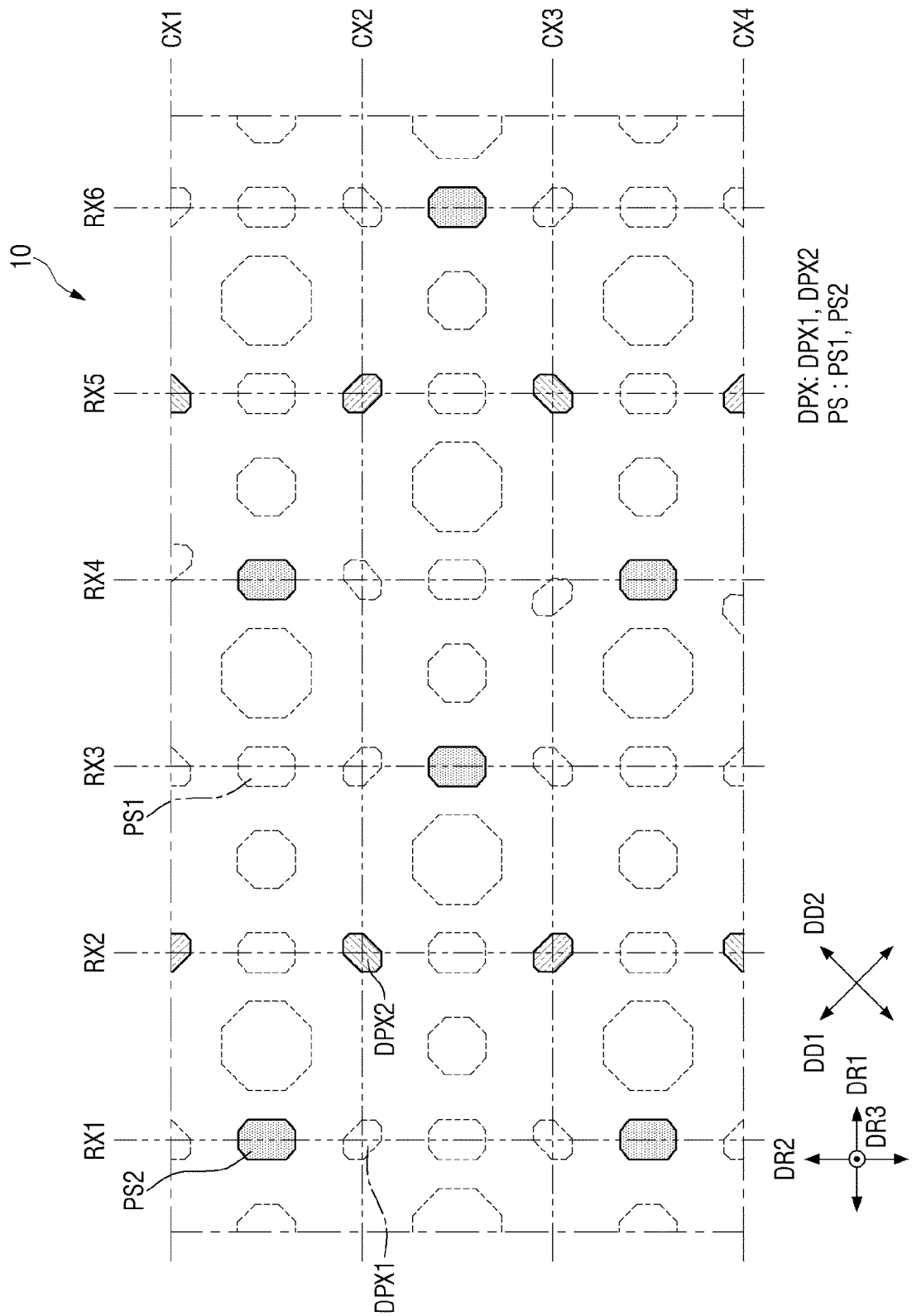
FIG. 15 is a plan view illustrating pixels emitting light and sensible photosensors during a second frame period according to an embodiment.

FIG. 14 is a plan view illustrating pixels emitting light and sensible photosensors during a first frame period according to an embodiment. FIG. 15 is a plan view illustrating pixels emitting light and sensible photosensors during a second frame period according to an embodiment.

An embodiment according to FIGS. 14 and 15 is substantially the same as an embodiment according to FIGS. 7 to 10 except for arrangements of the first sensing pixels DPX1 and the second sensing pixels DPX2 emitting the light and arrangements of the first photosensors PS1 and the second photosensors PS2 during the first frame period and the second frame period. Thus, for convenience of explanation, a further description of elements and technical aspects previously described will be omitted.

Referring to FIGS. 14 and 15, the sensing mode may include a first frame period and a second frame period. The first frame period and the second frame period may be sequentially repeated in the sensing mode.

Hereinafter, pixels that emit light during the first frame period are defined as first sensing pixels DPX1, and pixels that emit light during the second frame period are defined as second sensing pixels DPX2. In addition, sensors reading a fingerprint image according to digital sensed data generated by sensing light during the first frame period are defined as first photosensors PS1, and sensors reading a fingerprint image according to digital sensed data generated by sensing light during the second frame period are defined as second photosensors PS2. That is, in an embodiment, during the first frame period, the first sensing pixels DPX1 may emit the light and the second sensing pixels DPX2 do not emit the light. In addition, in an embodiment, the digital sensed data obtained by the second photosensors PS2 is not used.

Referring to FIG. 14, a plurality of columns may include 3N-th columns (where N is a positive integer), 3N−1-th columns, and 3N−2-th columns.

The first sensing pixels DPX1 may be arranged in the 3N−2-th columns (where N is a positive integer). The 3N−2-th columns may extend along the second direction DR2. In FIGS. 14 and 15, the first sensing pixels DPX1 may be arranged along the second direction DR2 in a first column RX1 and a fourth column RX4 of first to sixth columns RX1 to RX6. In addition, the first sensing pixels DPX1 may be arranged alternately with the second photosensors PS2 in the 3N−2-th columns. In addition, the first sensing pixels DPX1 may be arranged alternately with the second sensing pixels DPX2 along first to fourth rows CX1 to CX4. The first sensing pixels DPX1 may emit green light. The first sensing pixels DPX1 may be the second sub-pixels PX2 or the fourth sub-pixels PX4.

The second sensing pixels DPX2 may be arranged in the 3N−1-th columns and the 3N-th columns. The 3N−1-th columns and the 3N-th columns may extend along the second direction DR2. In FIGS. 14 and 15, the second sensing pixels DPX2 may be arranged along the second direction DR2 in the second column RX2, the third column RX3, the fifth column RX5, and the sixth column RX6 of the first to sixth columns RX1 to RX6. In addition, the second sensing pixels DPX1 may be arranged alternately with the first photosensors PS1 and the second photosensors PS2 in the 3N−1-th columns and the 3N-th columns. In addition, the second sensing pixels DPX2 may be arranged alternately with the first sensing pixels DPX1 along the first to fourth rows CX1 to CX4. The second sensing pixels DPX2 may neighbor (e.g., be adjacent to) the first sensing pixels DPX1 in the first direction DR1.

The first photosensors PS1 may be arranged in the 3N−1-th columns and the 3N-th columns. In FIGS. 14 and 15, the first photosensors PS1 may be arranged along the second direction DR2 in the second column RX2, the third column RX3, the fifth column RX5, and the sixth column RX6 of the first to sixth columns RX1 to RX6. In addition, the first photosensors PS1 may be arranged alternately with the second photosensors PS2 in the 3N−1-th columns and the 3N-th columns.

The second photosensors PS2 may be arranged in the 3N−2-th columns. In FIGS. 14 and 15, the second photosensors PS2 may be arranged along the second direction DR2 in the first column RX1 and the fourth column RX4 of the first to sixth columns RX1 to RX6. In addition, the second photosensors PS2 may be arranged alternately with the first sensing pixels DPX1 in the 3N−2-th columns.

However, the first sensing pixels DPX1, the second sensing pixels DPX2, the first photosensors PS1, and the second photosensors PS2 are not limited to being arranged in the first to sixth columns RX1 to RX6, and may be arranged in K columns and rows (where K is a natural number) according to embodiments.

An arrangement relationship between the respective sensing pixels DPX and photosensors PS according to the second frame period is substantially the same as that of FIG. 14 as described above. Thus, for convenience of explanation, a further description of elements and technical aspects previously described will be omitted.

FIG. 16 is a cross-sectional view illustrating pixels and photosensors according to an embodiment.

Referring to FIG. 16, a buffer layer 510 is disposed on a substrate SUB. The buffer layer 510 may include, for example, silicon nitride, silicon oxide, silicon oxynitride, or the like.

A first thin film transistor TFT1 and a second thin film transistor TFT2 may be disposed on the buffer layer 510. The first thin film transistor TFT1 and the second thin film transistor TFT2 may be disposed in a thin film transistor layer TFTL.

A plurality of thin film transistors TFT1 and TFT2 may include, respectively, semiconductor layers A1 and A2, a gate insulating layer 521 disposed on portions of the semiconductor layers A1 and A2, gate electrodes G1 and G2 disposed on the gate insulating layer 521, an interlayer insulating film 522 covering each of the semiconductor layers A1 and A2 and each of the gate electrodes G1 and G2, and source electrodes S1 and S2 and drain electrodes D1 and D2 disposed on the interlayer insulating film 522.

The semiconductor layers A1 and A2 may form channels of the first thin film transistor TFT1 and the second thin film transistor TFT2, respectively. The semiconductor layers A1 and A2 may include polycrystalline silicon. In an embodiment, the semiconductor layers A1 and A2 may include, for example, single crystal silicon, low-temperature polycrystalline silicon, amorphous silicon, or an oxide semiconductor. The oxide semiconductor may include, for example, a binary compound ($AB_x$), a ternary compound ($AB_xC_y$), or a quaternary compound ($AB_xC_yD_z$) containing, for example, indium, zinc, gallium, tin, titanium, aluminum, hafnium (Hf), zirconium (Zr), magnesium (Mg), and the like. The semiconductor layers A1 and A2 may include channel regions and source regions and drain regions doped with impurities, respectively.

The gate insulating layer 521 is disposed on the semiconductor layers A1 and A2. The gate insulating layer 521 electrically insulates a first gate electrode G1 and a first semiconductor layer A1 from each other, and electrically insulates a second gate electrode G2 and a second semiconductor layer A2 from each other. The gate insulating layer 521 may be made of an insulating material such as, for example, silicon oxide ($SiO_x$), silicon nitride ($SiN_x$), or metal oxide.

The first gate electrode G1 of the first thin film transistor TFT1 and the second gate electrode G2 of the second thin film transistor TFT2 are disposed on the gate insulating layer 521. The gate electrodes G1 and G2 may be formed above the channel regions of the semiconductor layers A1 and A2, that is, on positions of the gate insulating layer 521 overlapping the channel regions, respectively.

The interlayer insulating film 522 may be disposed on the gate electrodes G1 and G2. The interlayer insulating film 522 may include an inorganic insulating material such as, for example, silicon oxide ($SiO_x$), silicon nitride ($SiN_x$), silicon oxynitride, hafnium oxide, or aluminum oxide. In addition, in an embodiment, the interlayer insulating film 522 may include a plurality of insulating films, and may further include a conductive layer disposed between the insulating films and forming a capacitor second electrode.

The source electrodes S1 and S2 and the drain electrodes D1 and D2 are disposed on the interlayer insulating film 522. A first source electrode S1 of the first thin film transistor TFT1 may be electrically connected to the drain region of the first semiconductor layer A1 through a contact hole penetrating through the interlayer insulating film 522 and the gate insulating layer 521. A second source electrode S2 of the second thin film transistor TFT2 may be electrically connected to the drain region of the second semiconductor layer A2 through a contact hole penetrating through the interlayer insulating film 522 and the gate insulating layer 521. Each of the source electrodes S1 and S2 and the drain electrodes D1 and D2 may include one or more metals selected from the group including, for example, of aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu).

A planarization layer 530 may be formed on the interlayer insulating film 522 so as to cover each of the source electrodes S1 and S2 and the drain electrodes D1 and D2. The planarization layer 530 may be made of an organic insulating material or the like. The planarization layer 530 may have a flat surface and include contact holes exposing any one of the source electrodes S1 and S2 and any one of the drain electrodes D1 and D2.

A light emitting element layer EEL may be disposed on the planarization layer 530. The light emitting element layer EEL may include a first light emitting element EL1, a second light emitting element EL2, a first photoelectric conversion element PD1, a second photoelectric conversion element PD2, and a bank layer BK. The first light emitting element EL1 may include a first pixel electrode 571, a first emission layer 581, and a common electrode 590, and the second light emitting element EL2 may include a second pixel electrode 572, a second emission layer 582, and the common electrode 590. In addition, the first photoelectric conversion element PD1 may include a first light receiving electrode 573, a first photoelectric conversion layer 583, and the common electrode 590, and the second photoelectric conversion element PD2 may include a second light receiving electrode 574, a second photoelectric conversion layer 584, and the common electrode 590.

A pixel electrode 57a of the first light emitting element EL1 and the second light emitting element EL2 may be disposed on the planarization layer 530. For example, the pixel electrode 57a may include the first pixel electrode 571 of the first light emitting element EL1 and the second pixel electrode 572 of the second light emitting element EL2. In addition, the pixel electrode 57a may be provided for each pixel. The pixel electrode 57a may be connected to the first source electrode S1 or the first drain electrode D1 of the first thin film transistor TFT1 through a contact hole penetrating through the planarization layer 530.

The pixel electrode 57a of the light emitting element EL may have a single-layer structure of, for example, molybdenum (Mo), titanium (Ti), copper (Cu), or aluminum (Al) or have a stacked film structure, for example, a multilayer structure of ITO/Mg, ITO/MgF, ITO/Ag, or ITO/Ag/ITO including indium-tin-oxide (ITO), indium-zinc-oxide (IZO), zinc oxide (ZnO), or indium oxide ($In_2O_3$), and silver (Ag), magnesium (Mg), aluminum (Al), platinum (Pt), lead (Pb), gold (Au), or nickel (Ni), but is not limited thereto.

In addition, a light receiving electrode 57b of the first photoelectric conversion element PD1 and the second photoelectric conversion element PD2 may be disposed on the planarization layer 530. For example, the light receiving electrode 57b may include the first light receiving electrode 573 of the first photoelectric conversion element PD1 and the second light receiving electrode 574 of the second photoelectric conversion element PD2. The light receiving electrode 57b may be provided for each photosensor. The light receiving electrode 57b may be connected to the second source electrode S2 or the second drain electrode D2 of the second thin film transistor TFT2 through a contact hole penetrating through the planarization layer 530.

The light receiving electrode 57b of the first photoelectric conversion element PD1 and the second photoelectric conversion element PD2 may have a single-layer structure of, for example, molybdenum (Mo), titanium (Ti), copper (Cu), or aluminum (Al) or have a multilayer structure of, for example, ITO/Mg, ITO/MgF, ITO/Ag, or ITO/Ag/ITO, but is not limited thereto.

A first hole injection layer HIL1 and a hole transport layer HTL may be sequentially disposed on the pixel electrode 57a and the light receiving electrode 57b. The first hole injection layer HIL1 and the hole transport layer HTL may be disposed below each of the first emission layer 581 and the second emission layer 582 when the first emission layer 581 and the second emission layer 582 are made of an organic material. Each of the first hole injection layer HIL1 and the hole transport layer HTL may be a single layer or multiple layers made of an organic material.

The bank layer BK may be disposed on the hole transport layer HTL. The bank layer BK may include openings formed in areas overlapping the pixel electrode 57a and exposing the pixel electrode 57a. Areas in which the exposed pixel electrode 57a and the first and second emission layers 581 and 582 overlap each other may be defined as emission areas emitting different light according to each pixel PX.

In addition, the bank layer BK may include openings formed in areas overlapping the light receiving electrode 57b and exposing the light receiving electrode 57b. The openings exposing the light receiving electrode 57b may provide a space in which a photoelectric conversion layer 58b of each photosensor PS is formed.

The bank layer BK may include an organic insulating material such as, for example, a polyacrylates resin, an epoxy resin, a phenolic resin, a polyamides resin, a polyimides resin, an unsaturated polyesters resin, a polyphenyleneethers resin, a polyphenylenesulfides resin, or benzocyclobutene (BCB). As another example, the bank layer BK may also include an inorganic material such as, for example, silicon nitride.

The first emission layer 581 of the first light emitting element EL1 exposed by the opening of the bank layer BK may be disposed on the hole transport layer HTL. In addition, the second emission layer 582 of the second light emitting element EL2 may be disposed on the hole transport layer HTL. The first emission layer 581 and the second emission layer 582 may include a high molecular material or a low molecular material, and may emit red, green, or blue light for each pixel PX. The light emitted from the first emission layer 581 and the second emission layer 582 may contribute to image display or function as a light source incident on the photosensor PS.

Second hole injection layers HIL2 of the first photoelectric conversion element PD1 and the second photoelectric conversion element PD2 exposed by the openings of the bank layer BK may be disposed on the hole transport layer HTL. The second hole injection layers HIL2 may be disposed below the first photoelectric conversion layer 583 and the second photoelectric conversion layer 584 when the first photoelectric conversion layer 583 and the second photoelectric conversion layer 584 are made of an organic material. The second hole injection layer HIL2 may be a single layer or multiple layers made of an organic material.

The first photoelectric conversion layer 583 may be disposed on the second hole injection layer HIL2 of the first photoelectric conversion element PD1 exposed by the opening of the bank layer BK. An area in which the exposed second hole injection layer HIL2 and the first photoelectric conversion layer 583 overlap each other may be defined as a light sensing area of each fingerprint photosensor PS1. The first photoelectric conversion layer 583 may generate photocharges in proportion to incident light. The incident light may be light emitted from the first emission layer 581 and then reflected to enter the first photoelectric conversion layer 583 or may be light provided from outside of the display device 1 regardless of the first emission layer 581. Charges generated and accumulated in the first photoelectric conversion layer 583 may be converted into electrical signals utilized for sensing.

In addition, the second photoelectric conversion layer 584 may be disposed on the second hole injection layer HIL2 of the second photoelectric conversion element PD2 exposed by the opening of the bank layer BK. An area in which the exposed second hole injection layer HIL2 and the second photoelectric conversion layer 584 overlap each other may be defined as a light sensing area of each second photosensor PS2. The second photoelectric conversion layer 584 may generate photocharges in proportion to incident light. The incident light may be light emitted from the second emission layer 582 and then reflected to enter the second photoelectric conversion layer 584, or may be light provided from outside of the display device 1 regardless of the second emission layer 582. Charges generated and accumulated in the second photoelectric conversion layer 584 may be converted into electrical signals utilized for sensing.

The first photoelectric conversion layer 583 and the second photoelectric conversion layer 584 may include an electron donating material and an electron accepting material. The electron donating material may generate donor ions in response to light, and the electron accepting material may generate acceptor ions in response to light. When the first photoelectric conversion layer 583 and the second photoelectric conversion layer 584 are made of an organic material, the electron donating material may include a compound such as, for example, subphthalocyanine (SubPc) or dibutylphosphate (DBP), but is not limited thereto. The electron accepting material may include a compound such as, for example, fullerene, a fullerene derivative, or perylene diimide, but is not limited thereto.

Alternatively, when the first photoelectric conversion layer 583 and the second photoelectric conversion layer 584 are made of an inorganic material, the first photoelectric conversion element PD1 and the second photoelectric conversion element PD2 may be pn-type or pin-type phototransistors. For example, each of the first photoelectric conversion layer 583 and the second photoelectric conversion layer 584 may have a structure in which an N-type semiconductor layer, an I-type semiconductor layer, and a P-type semiconductor layer are sequentially stacked.

The common electrode 590 may be disposed on the first emission layer 581, the second emission layer 582, the first photoelectric conversion layer 583, the second photoelectric conversion layer 584, and the bank layer BK. The common electrode 590 may be disposed throughout the plurality of pixels PX and the plurality of photosensors PS in a form in which it covers the first emission layer 581, the second emission layer 582, the first photoelectric conversion layer 583, the second photoelectric conversion layer 584, and the bank layer BK. The common electrode 590 may include a material layer having a small work function, for example, Li, Ca, LiF/Ca, LiF/Al, Al, Mg, Ag, Pt, Pd, Ni, Au, Nd, Ir, Cr, BaF, Ba, or compounds or mixtures thereof (e.g., a mixture of Ag and Mg, etc.). Alternatively, the common electrode 590 may include, for example, transparent metal oxide, for example, indium-tin-oxide (ITO), indium-zinc-oxide (IZO), or zinc oxide (ZnO).

The common electrode 590 may be disposed in common on the first emission layer 581, the second emission layer 582, the first photoelectric conversion layer 583, and the second photoelectric conversion layer 584, but is not limited thereto. In this case, cathode electrodes of the first light emitting element EL1 and the second light emitting element EL2 and sensing cathode electrodes of the first photoelectric conversion element PD1 and the second photoelectric conversion element PD2 may be electrically connected to each other. For example, a common voltage line connected to the cathode electrodes of the first light emitting element EL1 and the second light emitting element EL2 may also be connected to the sensing cathode electrodes of the first photoelectric conversion element PD1 and the second photoelectric conversion element PD2.

An encapsulation layer TFEL may be disposed on the light emitting element layer EEL. The encapsulation layer TFEL may include at least one inorganic film to prevent or reduce oxygen or moisture from penetrating into each of the first emission layer 581, the second emission layer 582, the first photoelectric conversion layer 583, and the second photoelectric conversion layer 584. In addition, the encapsulation layer TFEL may include at least one organic film that protects each of the first emission layer 581, the second emission layer 582, the first photoelectric conversion layer 583, and the second photoelectric conversion layer 584 from foreign materials such as, for example, dust. For example, the encapsulation layer TFEL may be formed in a structure in which a first inorganic film 611 and an organic film 612 are sequentially stacked. Each of the first inorganic film 611 and the second inorganic film 613 may be formed as multiple films in which one or more inorganic films of, for example, a silicon nitride layer, a silicon oxynitride layer, a silicon oxide layer, a titanium oxide layer, and an aluminum oxide layer are alternately stacked. The organic film 612 may be an organic film made of, for example, an acrylic resin, an epoxy resin, a phenolic resin, a polyamide resin, a polyimide resin, or the like.

A window WDL may be disposed on the encapsulation layer TFEL. The window WDL may be disposed on the display device 1 and may protect components of the display device 1. The window WDL may be made of, for example, glass or plastic.

Figure 17:
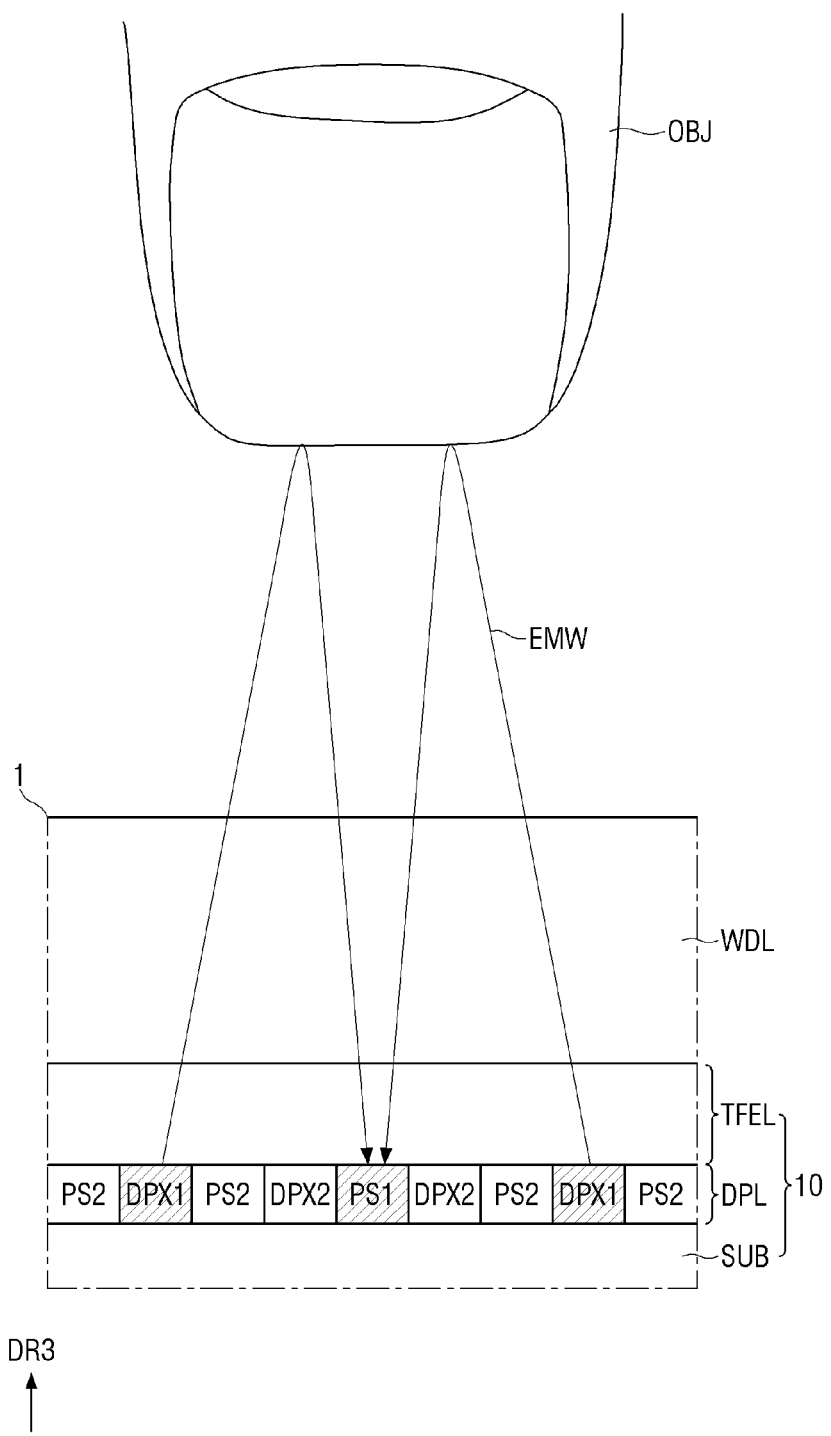
FIG. 17 is a cross-sectional view illustrating a method of sensing a gesture according to an embodiment.

FIG. 17 is a cross-sectional view illustrating a method of sensing a gesture according to an embodiment.

Each of the first sensing pixels DPX1 emits an electromagnetic wave EMW for a gesture according to a transmission signal. The electromagnetic wave EMW for a gesture may have a frequency of about 10 GHz to about 100 GHz or may have a frequency of about 39 GHz to about 60 GHz. As illustrated in FIG. 17, the electromagnetic wave EMW emitted from each of the first sensing pixels DPX1 may be reflected from a user OBJ or an object such as a pen positioned to be spaced apart from the window WDL by about 1 m.

Each of the first photosensors PS1 may receive a reception signal received according to the electromagnetic wave EMW reflected from the user OBJ or the object such as the pen. Here, a time interval may exist between a time when the electromagnetic waves EMW are transmitted by the first sensing pixels DPX1 and a time when the electromagnetic waves EMW are received by the first photosensors PS1. In addition, in a frequency of each reception signal according to the reflected electromagnetic wave EMW, a frequency shift of a transmission signal may occur due to the Doppler effect. The frequency shift is determined based on a relative velocity of the first sensing pixels DPX1 and the user OBJ or the object such as the pen.

Accordingly, the processor may recognize a user's approach gesture through digital sensed data according to the first photosensors PS1.

Also, in an embodiment, when the photosensors PS adjacent to the plurality of pixels PX output the sensed currents, portions of emission currents for emitting light from the plurality of pixels PX may leak to the photosensors PS adjacent to the plurality of pixels. That is, when the user's approach gesture is recognized through the digital sensed data of the first photosensor PS1 according to an embodiment of the disclosure, a magnitude of the leakage current may be smaller than when the user's approach gesture is recognized through the digital sensed data of the second photosensor PS2 adjacent to the sensing pixel emitting the light.

Accordingly, in an embodiment, when the sensing pixels DPX emit the light, the user's approach gesture may be accurately recognized through the digital sensed data of the photosensors PS that are not adjacent to the sensing pixels DPX.

Figure 18:
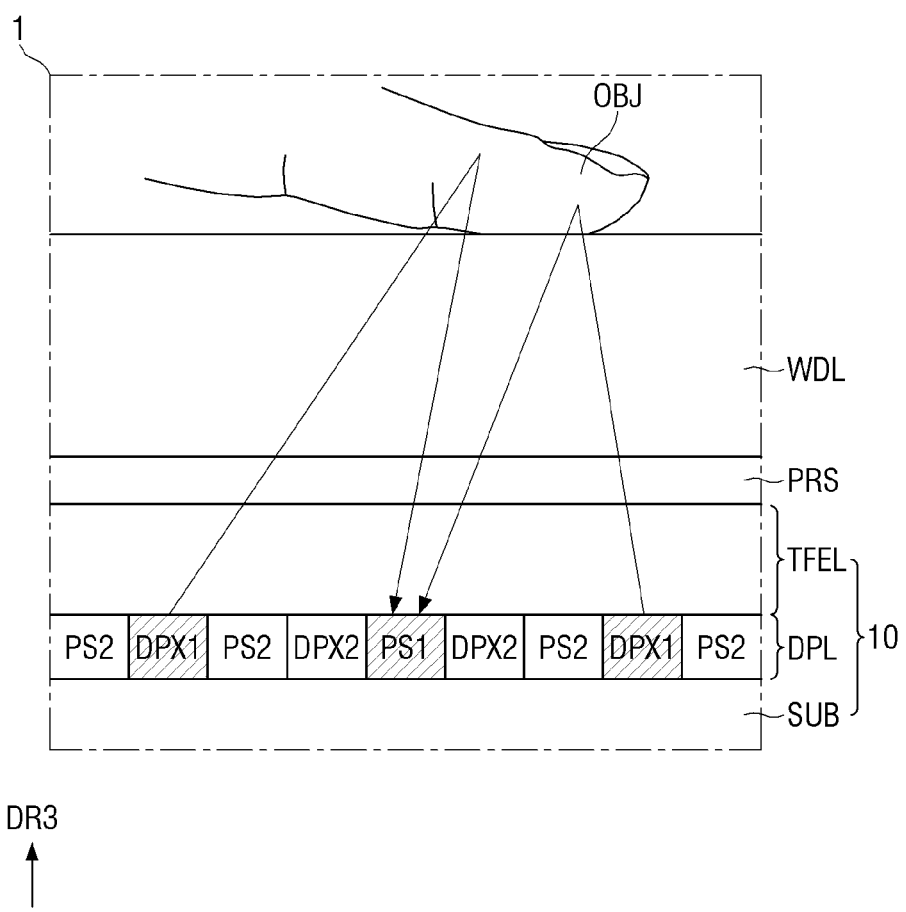
FIG. 18 is a cross-sectional view illustrating a blood pressure measurement method according to an embodiment.

FIG. 18 is a cross-sectional view illustrating a blood pressure measurement method according to an embodiment.

Referring to FIG. 18, the display device 1 may include a window WDL disposed on the display panel 10. The display panel 10 may include a substrate SUB, a pressure layer PRS disposed on the substrate SUB, a display layer DPL disposed on the pressure layer PRS and including the first sensing pixels DPX1 and second photosensors PS2, and an encapsulation layer TFEL disposed on the display layer DPL.

When a finger of the user OBJ is in contact with an upper surface of the window WDL of the display device 1, the pressure layer PRN may measure a pressure applied by the user OBJ. Accordingly, the processor 70 may calculate pressure data according to a time. For example, in a process in which the user OBJ brings his/her finger into contact with the upper surface of the window WDL, a pressure sensed by the pressure layer PRS may gradually increase over time to reach a maximum value. When the pressure (e.g., a contact pressure) increases, a blood vessel may be constricted, such that a blood flow rate may be decreased or become 0.

To measure blood pressure, pulse wave information according to a time is utilized together with the pressure data. During systole of the heart, blood ejected from the left ventricle of the heart moves to peripheral tissues, such that a blood volume in the arterial side increases. In addition, during the systole of the heart, red blood cells carry more oxyhemoglobin to the peripheral tissues. During diastole of the heart, there is partial suction of blood from the peripheral tissues toward the heart. In this case, when a peripheral blood vessel is irradiated with light emitted from a display pixel, the irradiated light may be absorbed by the peripheral tissue. Absorbance is dependent on a hematocrit and a blood volume. The absorbance may have a maximum value during the systole of the heart and a minimum value during the diastole of the heart. Since the absorbance is in inverse proportion to an amount of light incident on the second photosensor PS2, absorbance at a corresponding point in time may be estimated through light reception data of the amount of light incident on the second photosensor PS2, and the processor 70 may calculate the blood pressure of the user OBJ based on the light reception data and a pressure measurement value.

Also, in an embodiment, when the photosensors PS adjacent to the plurality of pixels PX output the sensed currents, portions of emission currents for emitting light from the plurality of pixels PX may leak to the photosensors PS adjacent to the plurality of pixels. That is, when the blood pressure is calculated through the digital sensed data of the first photosensor PS1 according to an embodiment of the disclosure, a magnitude of the leakage current may be smaller than when the blood pressure is calculated through the digital sensed data of the second photosensor PS2 adjacent to the sensing pixel emitting the light.

Accordingly, in an embodiment, when the sensing pixels DPX emit the light, the blood pressure may be accurately calculated through the digital sensed data of the photosensors PS that are not adjacent to the sensing pixels DPX.

Figure 19:
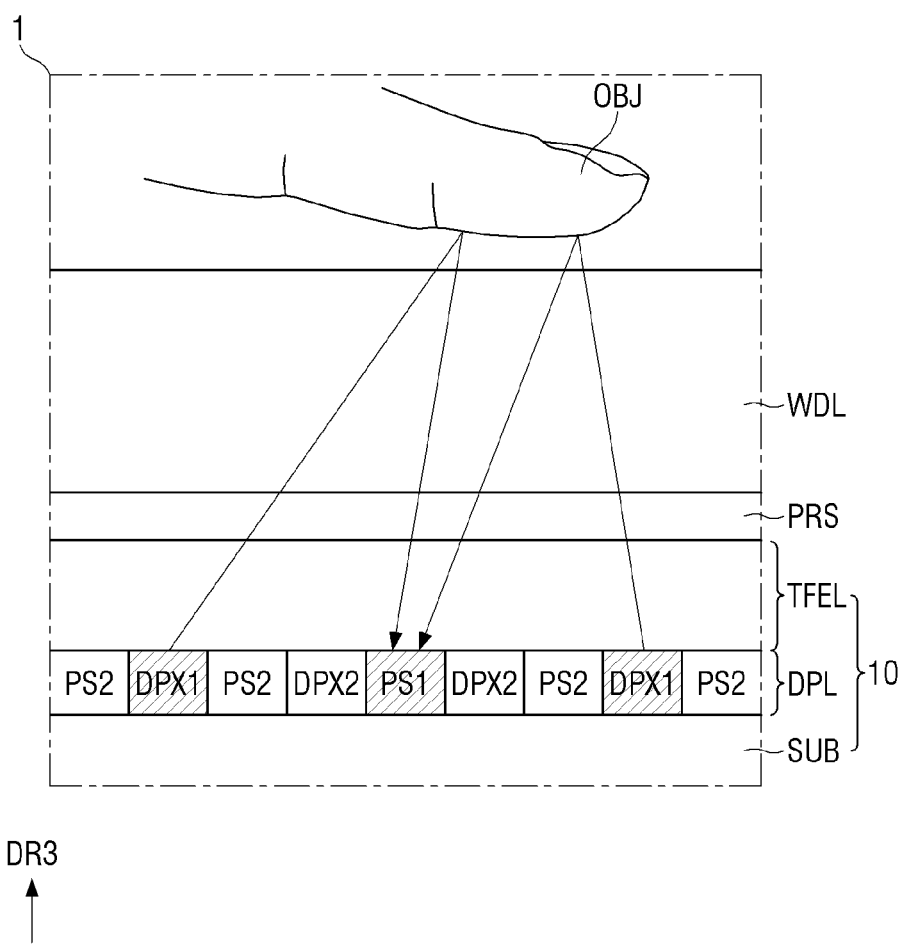
FIG. 19 is a cross-sectional view illustrating a blood pressure measurement method according to an embodiment.

FIG. 19 is a cross-sectional view illustrating a blood pressure measurement method according to an embodiment.

Referring to FIG. 19, when the finger of the user OBJ approaches the upper surface of the window WDL of the display device 1, the light output from the pixels PX of the display panel 10 may be reflected by the fingerprint F of the user OBJ. Also in this case, a refractive index of the fingerprint F and a refractive index of the air are different from each other, and thus, amounts of light reflected from a ridge and a valley of the fingerprint F may be different from each other. Accordingly, the photosensor PS outputs an electrical signal (e.g., a sensed current) based on a difference between amounts of reflected light, that is, light incident on the photosensor PS, and thus, the fingerprint F pattern of the finger may be identified. That is, even though the finger of the user OBJ is not in direct contact with the upper surface of the window WDL and approaches the upper surface of the window WDL, the fingerprint of the user OBJ may be recognized.

Also in an embodiment, when the sensing pixels DPX emit the light, the fingerprint may be accurately read through the digital sensed data of the photosensors PS that are not adjacent to the sensing pixels DPX.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:
a plurality of light emitting pixels that emit light;
a plurality of photosensors, each controlling a sensed current according to an incident light; and
a read-out circuit that senses the sensed current of each of the photosensors and converts the sensed current into digital sensed data,
wherein in a sensing mode including a first frame period and a second frame period,
the light emitting pixels include first sensing pixels that emit the light during the first frame period and second sensing pixels that do not emit the light during the first frame period,
the photosensors include first photosensors and second photosensors,
the first sensing pixels and the second photosensors are alternately disposed in a first column, and the second sensing pixels and the first photosensors are alternately disposed in a second column, and
a first distance between any one of the first sensing pixels and a first photosensor adjacent to the first sensing pixel among the first photosensors is greater than a second distance between the first sensing pixel and a second photosensor adjacent to the first sensing pixel among the second photosensors.

2. The display device of claim 1, further comprising:
a controller that excludes digital sensed data obtained by the second photosensors and reads a fingerprint image according to digital sensed data obtained by the first photosensors, in the first frame period.

3. The display device of claim 2,
wherein during the second frame period, the second sensing pixels emit the light, and the first sensing pixels do not emit the light, and
the first frame period is an odd frame period, and the second frame period is an even frame period.

4. The display device of claim 1,
wherein in the first frame period, a third distance between any one of the second sensing pixels and a second photosensor adjacent to the second sensing pixel among the second photosensors is greater than a fourth distance between the second sensing pixel and a first photosensor adjacent to the second sensing pixel among the first photosensors.

5. The display device of claim 4,
wherein the third distance is greater than the second distance, and the first distance is greater than the fourth distance.

6. The display device of claim 5,
wherein the first distance is the same as the third distance, and the second distance is the same as the fourth distance.

7. The display device of claim 1,
wherein in the first frame period, a third distance between any one of the first sensing pixels and a second sensing pixel adjacent to the first sensing pixel among the second sensing pixels is the same as a distance between the first sensing pixel and a first sensing pixel adjacent to the first sensing pixel among the first sensing pixels.

8. The display device of claim 7,
wherein the third distance is the same as a distance between the second sensing pixel and a second sensing pixel adjacent to the second sensing pixel among the second sensing pixels.

9. The display device of claim 7,
wherein the third distance is smaller than the first distance and greater than the second distance.

10. The display device of claim 7,
wherein in the first frame period, a fourth distance between any one of the first photosensors and a second photosensor adjacent to the first photosensor among the second photosensors is the same as a distance between the first photosensor and a first photosensor adjacent to the first photosensor among the first photosensors.

11. The display device of claim 10,
wherein the fourth distance is smaller than a distance between the second photosensor and a second photosensor adjacent to the second photosensor among the second photosensors.

12. The display device of claim 10,
wherein the fourth distance is greater than the second distance and smaller than the first distance.

13. The display device of claim 1,
wherein the light emitting pixels emit green light.

14. The display device of claim 1,
wherein in the first frame period, any one of the second photosensors is disposed between any one of the first sensing pixels and another first sensing pixel adjacent to the first sensing pixel.

15. The display device of claim 14,
wherein in the first frame period, any one of the second sensing pixels is disposed between any one of the first photosensors and another first photosensor adjacent to the first photosensor.

16. A display device, comprising:
a plurality of light emitting pixels that emit light; and
a plurality of photosensors, each controlling a sensed current according to an incident light,
wherein the light emitting pixels and the photosensors are alternately disposed in a first direction and a second direction orthogonal to the first direction, and
wherein in a sensing mode including a first frame period and a second frame period,
the light emitting pixels include first sensing pixels that emit the light during the first frame period and second sensing pixels that do not emit the light during the first frame period, and
the photosensors include first photosensors and second photosensors.

17. The display device of claim 16,
wherein the first photosensors and the second photosensors neighbor each other in the second direction.

18. The display device of claim 17,
wherein the first sensing pixels and the second sensing pixels neighbor each other in the second direction.

19. A display device, comprising:
a plurality of light emitting pixels that emit light;
a plurality of photosensors, including first photosensors and second photosensors, each controlling a sensed current according to an incident light;
a timing controller that provides first image data to a data driver during a first frame period and provides second image data to the data driver during a second frame period, in a sensing mode; and
the data driver that converts the first image data or the second image data into data voltages and supplies the data voltages to the light emitting pixels,
wherein the light emitting pixels include first sensing pixels and second sensing pixels,
each of the first sensing pixels receives a first data voltage for emitting light and each of the second sensing pixels receives a second data voltage for not emitting light, based on the first image data during the first frame period in the sensing mode,
each of the second sensing pixels receives the first data voltage and each of the first sensing pixels receives the second data voltage, based on the second image data during the second frame period in the sensing mode, and
the first sensing pixels and the second photosensors are alternately disposed in a first column, and the second sensing pixels and the first photosensors are alternately disposed in a second column.

20. The display device of claim 19, further comprising:
a read-out circuit that senses the sensed current of each of the photosensors and converts the sensed current into digital sensed data,
wherein
a processor that excludes digital sensed data obtained by the second photosensors and reads a fingerprint image according to digital sensed data obtained by the first photosensors, in the first frame period and that excludes digital sensed data obtained by the first photosensors and reads the fingerprint image according to the digital sensed data obtained by the second photosensors, during the second frame period.

* * * * *